US009862382B2

(12) United States Patent
Nakamura

(10) Patent No.: US 9,862,382 B2
(45) Date of Patent: Jan. 9, 2018

(54) TRAVEL CONTROL DEVICE AND METHOD FOR VEHICLE

(71) Applicant: Nissan Motor Co., Ltd., Yokohama-Shi, Kanagawa (JP)

(72) Inventor: Masahide Nakamura, Kanagawa (JP)

(73) Assignee: Nissan Motor Co., Ltd., Yokohama-Shi, Kanagawa (JP)

(*) Notice: Subject to any disclaimer, the term of this patent is extended or adjusted under 35 U.S.C. 154(b) by 0 days.

(21) Appl. No.: 15/501,115

(22) PCT Filed: Aug. 11, 2014

(86) PCT No.: PCT/JP2014/071180
§ 371 (c)(1),
(2) Date: Feb. 1, 2017

(87) PCT Pub. No.: WO2016/024315
PCT Pub. Date: Feb. 18, 2016

(65) Prior Publication Data
US 2017/0291603 A1 Oct. 12, 2017

(51) Int. Cl.
B60W 30/095 (2012.01)
G08G 1/16 (2006.01)
(Continued)

(52) U.S. Cl.
CPC ......... B60W 30/095 (2013.01); B60W 30/02 (2013.01); B60W 30/12 (2013.01);
(Continued)

(58) Field of Classification Search
CPC .... B60W 30/095; B60W 30/02; B60W 30/12; B60W 30/143; G08G 1/16
(Continued)

(56) References Cited

U.S. PATENT DOCUMENTS 6,138,062 A 10/2000 Usami
7,317,973 B2 * 1/2008 Dieterle ............. B60K 31/0008
180/167

(Continued)

FOREIGN PATENT DOCUMENTS

JP H1031799 A 2/1998
JP 2005182753 A 7/2005
(Continued)

Primary Examiner — Thomas G Black
Assistant Examiner — Luke Huynh
(74) Attorney, Agent, or Firm — Young Basile Hanlon & MacFarlane, P.C.

(57) ABSTRACT

A travel control device acquires subject vehicle information including the position of a subject vehicle, acquires object information including the position of an avoidance object which the subject vehicle should avoid, plans a target route for avoiding the avoidance object in accordance with the position of the subject vehicle and the position of the avoidance object, and outputs command information for driving the subject vehicle on the target route. The planning function is used to reduce the distance from the subject vehicle to a turning point as a margin distance decreases. The margin distance is the distance between the subject vehicle and a lane marker on a road on which the subject vehicle is traveling and is along a width direction of the road. The turning point is a point at which the location of the target route along the width direction varies by a predetermined distance or more.

16 Claims, 13 Drawing Sheets

(51) Int. Cl.
  *B60W 30/02* (2012.01)
  *B60W 30/14* (2006.01)
  *B60W 30/12* (2006.01)
  *B60W 30/09* (2012.01)
  *B60W 30/045* (2012.01)
  *B60W 30/16* (2012.01)

(52) U.S. Cl.
  CPC ............ *B60W 30/143* (2013.01); *G08G 1/16* (2013.01); *B60W 30/045* (2013.01); *B60W 30/09* (2013.01); *B60W 30/16* (2013.01); *B60W 2550/306* (2013.01)

(58) Field of Classification Search
  USPC ................ 701/96, 533, 36, 41, 48, 70, 301; 340/435
  See application file for complete search history.

(56) References Cited

U.S. PATENT DOCUMENTS

| | | | | |
|---|---|---|---|---|
| 7,840,331 | B2* | 11/2010 | Yoshioka | G08G 1/164 340/995.13 |
| 8,065,084 | B2* | 11/2011 | Urban | B60W 40/02 340/435 |
| 8,306,700 | B2* | 11/2012 | Kobayashi | B60T 8/17557 382/103 |
| 8,364,390 | B2* | 1/2013 | Harada | G08G 1/096725 340/435 |
| 8,798,841 | B1* | 8/2014 | Nickolaou | B62D 15/0265 340/435 |
| 8,947,218 | B2* | 2/2015 | Yoshizawa | B60R 1/00 340/435 |
| 2005/0125121 | A1 | 6/2005 | Isaji et al. | |
| 2010/0004840 | A1* | 1/2010 | Klotz | B60W 30/16 701/96 |
| 2011/0187515 | A1 | 8/2011 | Saito et al. | |
| 2013/0054128 | A1* | 2/2013 | Moshchuk | G08G 1/167 701/301 |
| 2013/0268174 | A1* | 10/2013 | Koshizen | B60W 30/16 701/96 |
| 2014/0200801 | A1 | 7/2014 | Tsuruta et al. | |
| 2016/0052547 | A1 | 2/2016 | Kashiwai | |

FOREIGN PATENT DOCUMENTS

| | | |
|---|---|---|
| JP | 2005324782 A | 11/2005 |
| JP | 2006321299 A | 11/2006 |
| JP | 2008132867 A | 6/2008 |
| JP | 2010070069 A | 4/2010 |
| JP | 2010163164 A | 7/2010 |
| JP | 2013091401 A | 5/2013 |
| JP | 2014136480 A | 7/2014 |
| JP | 2014218098 A | 11/2014 |

* cited by examiner

TRAVEL CONTROL DEVICE AND METHOD FOR VEHICLE

TECHNICAL FIELD

The present invention relates to a travel control device and its method that control travel of a vehicle.

BACKGROUND

A travel control device is known which plans a target route for a subject vehicle in accordance with presence or absence of an avoidance object which the subject vehicle should avoid, and drives the subject vehicle on the target route. With regard to this kind of device, JP2013-091401A discloses a device in which the target route is planned at the right side from a normal position when an approaching vehicle is detected at the left side of the subject vehicle and the target route is planned at the left side from the normal position when an approaching vehicle is detected at the right side of the subject vehicle.

In the above prior art, however, even when the road width of a road on which the subject vehicle is traveling is narrow and the distance along which the subject vehicle can move in the road width direction is small, the target route is varied to the right or left with respect to the approaching vehicle without exception. This may lead to a problem in that the passengers of the subject vehicle feel an uncomfortable feeling because the subject vehicle traces a different route than the route the passengers expect.

SUMMARY

A problem to be solved by the present invention is to mitigate an uncomfortable feeling given to passengers when performing control of a traveling subject vehicle for avoiding an avoidance object.

The present invention solves the above problem by reducing the distance from a subject vehicle to a certain turning point in a target route as a margin distance (margin width) decreases. The margin distance is a distance between the subject vehicle and a lane marker on a road on which the subject vehicle is traveling. The margin distance is along the width direction of the road.

According to the present invention, the shorter the above margin distance is, the distance from the subject vehicle to the certain turning point in the target route is planned shorter to advance the timing of starting avoidance of the avoidance object. Therefore, when the subject vehicle passes by the side of the avoidance object, the target route (driving route) matches the route the passengers expect. As a result, the travel control can be executed without an uncomfortable feeling given to the passengers.

DETAILED DESCRIPTION OF THE DRAWINGS

DETAILED DESCRIPTION OF THE EMBODIMENTS

Hereinafter, one or more embodiments of the present invention will be described with reference to the drawings. In the embodiments, the present invention will be described by exemplifying examples in which the travel control device for a vehicle according to the present invention is applied to a travel control system equipped in a vehicle. The travel control device of the present invention, however, is not limited to the above and can also be applied to a portable terminal device that can exchange information with the side of a vehicle. The travel control device, travel control system and portable terminal device are each composed of a computer that executes an input/output process and calculation process.

Figure 1:
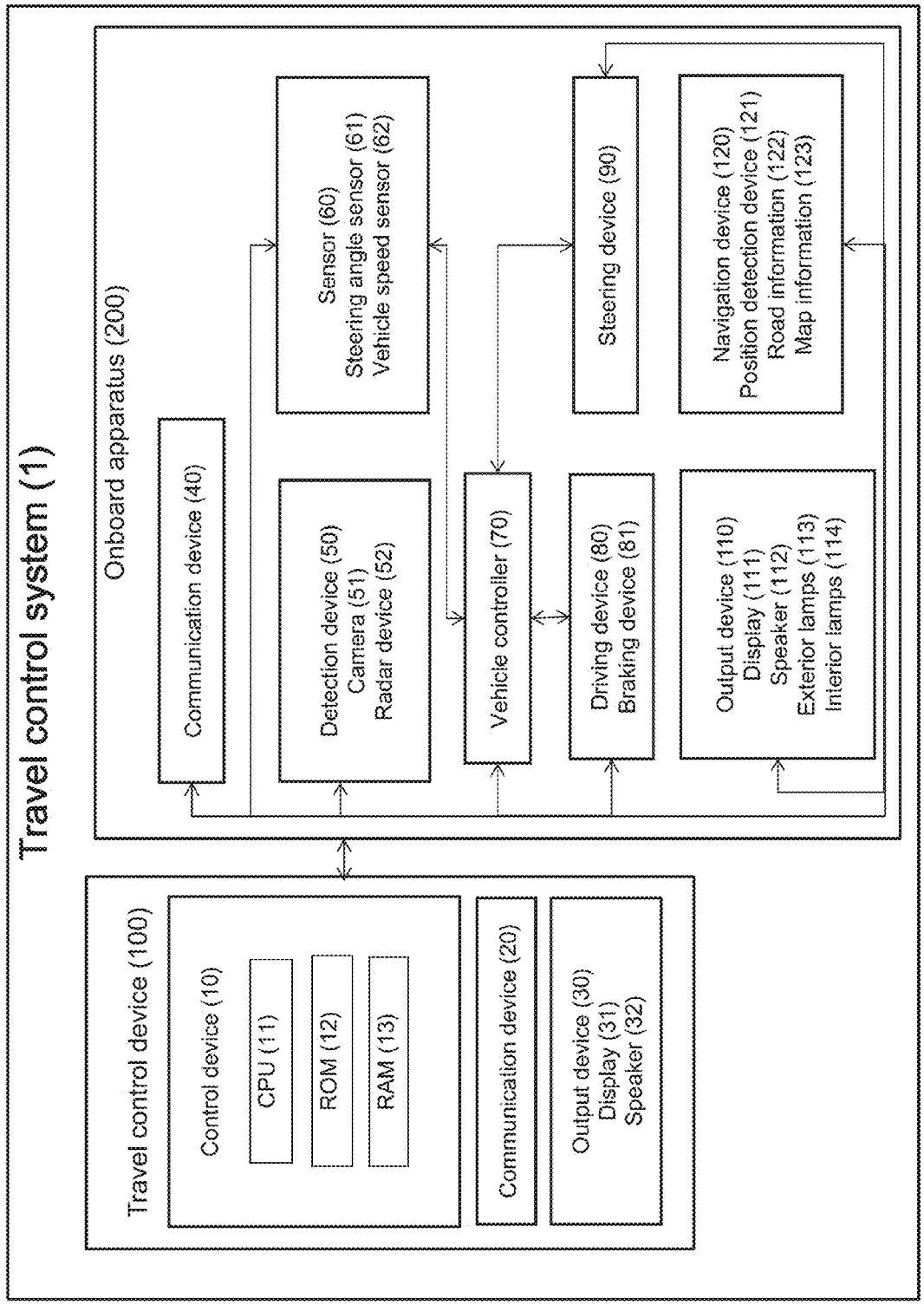
FIG. 1 is a block diagram illustrating a travel control system according to one or more embodiments of the present invention.

FIG. 1 is a diagram illustrating a block configuration of a travel control system 1 according to one or more embodiments of the present invention. The travel control system 1 is equipped in a vehicle and comprises a travel control device 100 and an onboard apparatus 200.

The travel control device 100 according to one or more embodiments of the present invention has a lane departure prevention function (lane keep support function) to recognize a lane in which the subject vehicle is traveling and control the moving behavior of the subject vehicle so as to maintain a certain relationship between the position of a lane mark of the lane and the position of the subject vehicle. The travel control device 100 according to one or more embodiments of the present invention controls the moving behavior of the subject vehicle so that the subject vehicle travels along the center of a lane. The travel control device 100 may control the moving behavior of the subject vehicle so that the distance from the lane mark of a lane to the subject vehicle along the road width direction falls within a predetermined range.

The travel control device 100 and the onboard apparatus 200 have communication devices 20 and 40, respectively, and exchange information with each other via wired or wireless communication.

The onboard apparatus 200 will first be described.

The onboard apparatus 200 according to one or more embodiments of the present invention comprises a detection device 50, sensor 60, vehicle controller 70, driving device 80, steering device 90, output device 110, and navigation device 120. These devices which constitute the onboard apparatus 200 are connected to one another via a CAN (Controller Area Network) or other in-vehicle LAN to mutually exchange information.

These devices which constitute the onboard apparatus 200 will each be described below.

The detection device 50 detects the existence of an avoidance object which the vehicle should avoid and its existence position. The detection device 50 according to one or more embodiments of the present invention includes, but is not limited to including, a camera 51. The camera 51 according to one or more embodiments of the present invention is, for example, a camera that comprises an imaging element, such as CCD. The camera 51 according to one or more embodiments of the present invention, which is installed in the subject vehicle, captures images around the subject vehicle and acquires data of images that include avoidance objects existing around the subject vehicle.

The detection device 50 processes the acquired image data to calculate the distance from the subject vehicle to an avoidance object on the basis of the position of the avoidance object relative to the subject vehicle. The detection device 50 also calculates, as object information, a relative speed and relative acceleration between the subject vehicle and the avoidance object from a variation over time of the position of the avoidance object. As for a process to calculate the positional relationship between the subject vehicle and another vehicle based on the image data and a process to calculate the speed information based on the amount of variation over time of the positional relationship, schemes known at the time of filing of the present application can be appropriately used.

In addition or alternatively, the detection device 50 may analyze the image data and identify the type of the avoidance object on the basis of the analysis result. The detection device 50 can use a pattern matching technique or the like to identify whether the avoidance object included in the image data is a vehicle, pedestrian or traffic sign, and the like. The detection device 50 can also extract the image of an object from the image data to specify the type of the object in accordance with the profile and/or features of the object.

In addition or alternatively, the detection device 50 according to one or more embodiments of the present invention may use a radar device 52. Examples of the radar device 52 may be those, such as millimeter-wave radar, laser radar and ultrasonic radar, which are known at the time of filing of the present application.

The object information detected in such a manner, including at least the position of an avoidance object, is sent to the side of the travel control device 100. The detection device 50 may include various information items in the object information and send it to the side of the travel control device 100. Examples of such information items include speed and acceleration information obtained from the variation in position of the avoidance object, information on the type of the avoidance object, and information on the vehicle type and the like when the avoidance object is a vehicle.

The "avoidance object" in one or more embodiments of the present invention refers to an object which the subject vehicle should avoid to travel (so that the subject vehicle does not excessively come close to the object). The detection device 50 detects an object having a certain positional relationship with the subject vehicle as the avoidance object.

Avoidance objects in one or more embodiments of the present invention include a stationary object and moving object. Examples of the stationary object include other vehicles that are parked or stopped; road structures, such as walkways; center dividers and guardrails; road equipment, such as road signs and power or telephone poles; temporary objects on a road, such as falling objects and removed snow; and pedestrians standing, which may be obstacles for a vehicle traveling. Examples of the moving object include other vehicles traveling and pedestrians walking. Examples of such other vehicles include two-wheel vehicles, such as bicycles and motorbikes; large-sized vehicles, such as buses and trucks; special-purpose vehicles, such as trailers and crane cars; emergency vehicles, such as ambulance cars, fire truck and police cars; and standard-sized cars. Examples of avoidance objects further include those in which objects may not necessarily exist but which the subject vehicle should avoid, such as construction sites, damaged areas of roads and waterholes. When a subject vehicle V1 is traveling, avoidance objects for the vehicle include preceding vehicles, following vehicles, and oncoming vehicles.

The sensor 60 according to one or more embodiments of the present invention comprises a steering angle sensor 61 and vehicle speed sensor 62. The steering angle sensor 61 detects steering information regarding the steering, such as a steering amount, steering speed and steering acceleration of the subject vehicle, and sends it to the vehicle controller 70 and the travel control device 100. The vehicle speed sensor 62 detects a speed and acceleration of the subject vehicle and sends them to the vehicle controller 70 and the travel control device 100.

The vehicle controller 70 according to one or more embodiments of the present invention is an onboard computer, such as an engine control unit (ECU), and electronically controls the driving state of the vehicle. The vehicle according to one or more embodiments of the present invention may be, for example, an electric car having an electric motor as the traveling drive source, an engine car having an internal-combustion engine as the traveling drive source, or a hybrid car having both the electric motor and internal combustion engine as the traveling drive sources. Examples of the electric car and hybrid car having an electric motor as the traveling drive source include a type in which the power source for the motor is a secondary battery and a type in which the power source for the motor is a fuel cell.

The driving device 80 according to one or more embodiments of the present invention comprises a drive mechanism of the subject vehicle V. The drive mechanism includes an electric motor and/or internal-combustion engine as the above-described traveling drive source, a power transmission device including a drive shaft and automatic transmission that transmit the output of the traveling drive source to the drive wheels, and a braking device that brakes wheels. The driving device 80 generates respective control signals for these components of the drive mechanism and executes the travel control including acceleration and deceleration of the vehicle. These control signals for the drive mechanism are generated on the basis of input signals by an accelerator operation and brake operation of the driver and control signals acquired from the vehicle controller 70 or from the travel control device 100. Command information may be sent to the driving device 80, which can thereby automatically perform the travel control including acceleration and deceleration of the vehicle. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention has a steering actuator. The steering actuator includes a motor and other necessary components attached to the steering column shaft. The steering device 90 executes the steering control for the vehicle on the basis of a control signal acquired from the vehicle controller 70 or an input signal by the steering operation of the driver. The vehicle controller 70 sends command information, including a steering amount, to the steering device 90 thereby to execute the steering control. In addition or alternatively, the travel control device 100 may control a braking quantity for each wheel of the vehicle thereby to execute the steering control. In this case, the vehicle controller 70 sends command information, including the braking quantity for each wheel, to a braking device 81 provided together with the driving device 80, thereby to execute the steering control for the vehicle.

The navigation device 120 according to one or more embodiments of the present invention calculates a route from the current position of the subject vehicle to a destination and outputs route guidance information via the output device 110 which will be described later. The navigation device 120 has a position detection device 121, road information 122 including a road type, road width, road shape and others, and map information 123 in which the road information 122 is associated with each point. The position detection device 121 according to one or more embodiments of the present invention is responsible to the Global Positioning System (GPS) and detects a position (latitude and longitude) at which the vehicle is traveling. The navigation device 120 specifies a road link on which the subject vehicle travels, on the basis of the current position of the subject vehicle detected by the position detection device 121. The road information 122 according to one or more embodiments of the present invention is stored such that identification information for each road link is associated with the road type, road width, road shape, whether or not the overtaking is permitted (whether or not the lane change to an adjacent lane is permitted), and other road-related information. The navigation device 120 refers to the road information 122 to acquire the information regarding a road to which the road link on which the subject vehicle travels belongs, and sends the information to the travel control device 100. The road type, road width and road shape of a road on which the subject vehicle travels are used in a travel control process to calculate a target route on which the subject vehicle is to travel.

The output device 110 according to one or more embodiments of the present invention outputs various information items regarding the travel assistance to the user or to passengers of surrounding vehicles. In one or more embodiments of the present invention, the output device 110 outputs at least one of information in accordance with the object information, information in accordance with the location of the object area, information in accordance with the location of the target route, and information in accordance with the command information for driving the subject vehicle on the target route. The output device 110 according to one or more embodiments of the present invention includes a display 111, speaker 112, exterior lamps 113, and interior lamps 114. The exterior lamps 113 include headlights, winker lamps, and brake lamps. The interior lamps 114 include lighting displays of indicators and lighting displays of the display 111 as well as lamps provided at the steering and lamps provided around the steering. The output device 110 according to one or more embodiments of the present invention may output various information items regarding the travel assistance to external devices, such as Intelligent Transport Systems (ITS) via the communication device 40. The external devices, such as Intelligent Transport Systems use the information regarding the travel assistance, including the speed of the vehicle, steering information, traveling route, etc., for the traffic management of a plurality of vehicles.

Specific forms of outputting information will be described with reference to an example in which a parked vehicle as the avoidance object exists at the forward left side of the subject vehicle.

The output device 110 provides passengers of the subject vehicle with a direction and/or position in which the parked vehicle exists, as the information in accordance with the object information. The display 111 displays the direction and/or position in which the parked vehicle exists in a form that can be visually recognized. The speaker 112 reads out a text that informs the direction and/or position in which the parked vehicle exists, such as "Please be advised a parked vehicle exists at the forward left side." Among lamps provided as the exterior lamps 113 at left and right door mirrors, only the left-side lamp may be blinked to inform the subject vehicle's passengers that a parked vehicle exists at the forward left side. Among lamps provided as the interior lamps 114 at the left and right in the vicinity of the steering, only the left-side lamp may be blinked to inform the passengers that a parked vehicle exists at the forward left side.

A direction and/or position in which the object area is set may be output via the output device 110 as the information in accordance with the location of the object area. The passengers can be informed that an object area is set at the forward left side, in a similar manner to the above, via the display 111, speaker 112, exterior lamps 113, and/or interior lamps 114.

In one or more embodiments of the present invention, in view of preliminarily informing other vehicles' passengers of the moving behavior of the subject vehicle, the direction and/or position in which the object area is set may be output to the external using the exterior lamps 113. After the object area is set, the travel direction of the subject vehicle is changed (steering is performed) to avoid the object area (to pass by the side). By informing the external of the object area being set, the drivers of other vehicles can be preliminarily noticed that the travel direction of the subject vehicle will be changed to avoid the object area. For example, when the object area is set at the frontward left side, right-side winker lamps (exterior lamps 113) may be lighted to inform the external other vehicles and the like that the subject vehicle will deviate rightward to avoid the object area which is set at the left side.

Further, the passengers can be informed of the shape of the target route and/or the position of a curve point as the information in accordance with the location of the target route, by the display 111 and/or the speaker 112. The display 111 displays the shape and the like of the target route as a diagrammatic view that can be visually recognized. The speaker 112 outputs an announcement, such as "Turn right to avoid the parked vehicle" or "To avoid the parked vehicle ahead, the steering will be turned to the right."

Furthermore, passengers of the subject vehicle or passengers of other vehicles may be preliminarily informed that the turning operation and/or acceleration or deceleration will be performed, as the information in accordance with the command information for driving the subject vehicle on the target route, via the display 111, speaker 112, exterior lamps 113 and/or interior lamps 114.

Thus, by outputting the information regarding the travel control when avoiding the object area, passengers of the subject vehicle and/or other vehicles can be preliminarily informed of the behavior of the subject vehicle. The output device 110 may output the above-described information to external devices, such as the Intelligent Transport Systems via the communication device 20. This allows the passengers of the subject vehicle and/or the passengers of other vehicles to respond to the behavior of the subject vehicle which is under the travel control.

The travel control device 100 according to one or more embodiments of the present invention will be described below.

As illustrated in FIG. 1, the travel control device 100 according to one or more embodiments of the present invention comprises a control device 10, communication device 20, and output device 30. The communication device 20 exchanges information with the onboard apparatus 200. The output device 30 has a similar function to that of the previously-described output device 110 of the onboard apparatus 200. When the travel control device 100 is a computer that can be carried by a passenger, the travel control device 100 may output, to each device, command information for controlling the blinking of the exterior lamps 113 and/or interior lamps 114 of the onboard apparatus.

The control device 10 of the travel control device 100 is a computer comprising: a ROM (Read Only Memory) 12 that stores programs for presenting different travel control information in accordance with the degree of proximity between the subject vehicle and other vehicles; a CPU (Central Processing Unit) 11 as an operation circuit that executes the programs stored in the ROM 12 to function as the travel control device 100; and a RAM (Random Access Memory) 13 that functions as an accessible storage device.

The control device 10 of the travel control device 100 according to one or more embodiments of the present invention has a subject vehicle information acquisition function, object information acquisition function, area setting function, route planning function, control function, and presentation function. The control device 10 according to one or more embodiments of the present invention executes each function by cooperation of software for realizing the above functions and the above-described hardware.

Each function of the travel control device 100 according to one or more embodiments of the present invention will be described below.

First, the subject vehicle information acquisition function of the control device 10 will be described. The control device 10 acquires subject vehicle information that includes the position of the subject vehicle. The position of the subject vehicle can be acquired by the position detection device 121 of the navigation device 120. The subject vehicle information further includes the vehicle speed and acceleration of the subject vehicle. The control device 10 acquires the speed of the subject vehicle from the vehicle speed sensor 62. The speed of the subject vehicle can also be acquired on the basis of a variation over time of the position of the subject vehicle. The acceleration of the subject vehicle can be obtained from the speed of the subject vehicle.

The object information acquisition function of the control device 10 will be described. The control device 10 acquires object information that includes the position of an avoidance object which the subject vehicle should avoid. The control device 10 acquires the object information which includes the position of the avoidance object detected by the detection device 50. The object information further includes a relative position, relative speed and relative acceleration of the avoidance object.

When the avoidance object is another vehicle and this other vehicle and the subject vehicle are capable of inter-vehicle communication (communication in which a plurality of vehicles can directly communicate with one another without using a server or the like), the control device 10 of the subject vehicle may acquire, as the object information, the vehicle speed and acceleration of the other vehicle detected by the vehicle speed sensor of the other vehicle. As will be understood, the control device 10 can also acquire avoidance information that includes the position, speed and acceleration of the other vehicle from external devices of the Intelligent Transport Systems (ITS).

The area setting function and route planning function of the control device 10 will be described. In one or more embodiments of the present invention, the control device 10 uses the area setting function to set an object area R for the avoidance object. Then, the control device 10 uses the route planning function to plan a target route on which the subject vehicle V1 is to travel, on the basis of the location of the object area R set for the avoidance object.

Figure 2A:
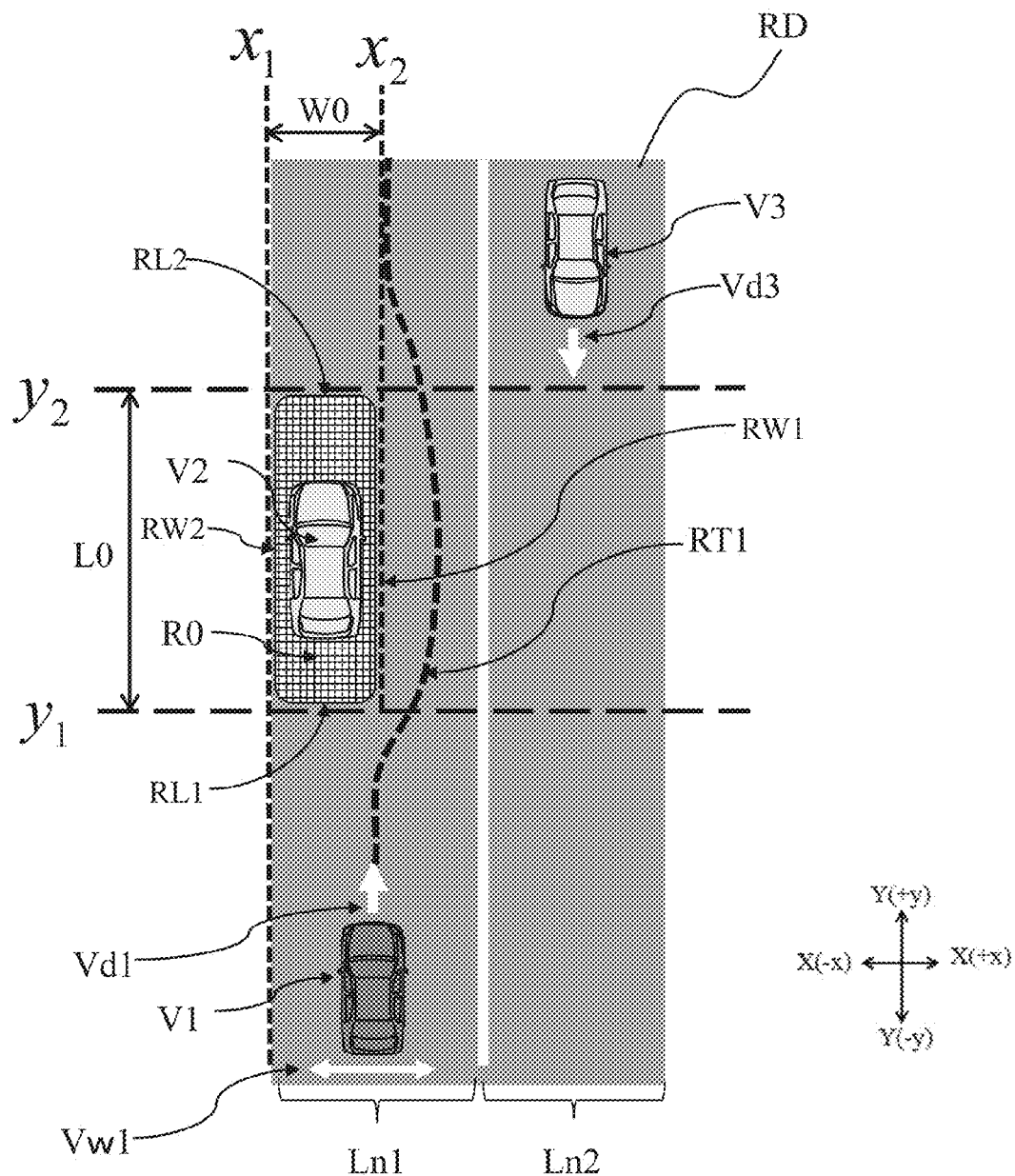
FIG. 2A is a plan view for describing a process to set an object area used for planning a target route.

A method of setting the object area R using the area setting function of the control device 10 will first be described. The control device 10 sets the object area R (any object area may be denoted by "R" hereinafter) for the avoidance object on the basis of the relationship between the position of the subject vehicle and the position of the avoidance object. FIG. 2A is a view illustrating an example of a scheme to set the object area R. In FIG. 2A, the travel direction Vd1 of the subject vehicle is +y direction in the figure. In FIG. 2A, the extending direction of a travel lane Ln1 in which the subject vehicle travels is also +y direction in the figure.

FIG. 2A is a view when viewing from above a scene of detecting another vehicle V2 that is parked at the left-side road shoulder of the travel lane Ln1 for the subject vehicle. The detected other vehicle V2 exists in the travel lane Ln1 for the subject vehicle V1 and is therefore an avoidance object which the subject vehicle V1 should avoid because the other vehicle V2 will interfere the subject vehicle V1 traveling straight ahead. The control device 10 sets an object area R0 within a region that includes the other vehicle V2.

In one or more embodiments of the present invention, the object area R set for an avoidance object may be set with consideration for avoiding a state in which the distance between the subject vehicle V1 and the avoidance object becomes less than a predetermined value so that they come close to each other or come into contact with each other, or may also be set with consideration for the subject vehicle V1 and the avoidance object to maintain an appropriate distance. In one or more embodiments of the present invention, the object area R may have a shape that analogously follows the outer shape of an avoidance object or may also have a shape that includes an avoidance object. The control device 10 may set the border of the object area R as a shape that analogously follows the outer shape of an avoidance object or as a shape that includes an avoidance object, such as a circular shape, elliptical shape, rectangular shape, and polygonal shape. The object area R may be set narrow such that the boundary of the object area R is separate from the surface (outer edge) of an avoidance object by less than a predetermined distance (A) or may also be set wide such that the boundary of the object area R is separate from the avoidance object by a predetermined distance B (B>A) or more.

As illustrated in FIG. 2A, when the travel direction Vd1 of the subject vehicle is defined as the forward direction while its reverse direction is defined as the backward direction, the object area R0 has longitudinal end parts RL1 and RL2 at the rear side and front side of the object area R0, respectively. These longitudinal end parts RL1 and RL2 represent end lines that define the length of the object area R0 along the extending direction (+y) of the travel lane Ln1 for the subject vehicle. The length of the object area R0 illustrated in FIG. 2A along the extending direction (+y) of the travel lane Ln1 is L0 that is a distance between the longitudinal end part RL1 (y1) and the longitudinal end part RL2 (y2). Among the longitudinal end parts RL1 and RL2, the longitudinal end part located at near side (upstream side) when viewed from the subject vehicle V1 approaching the object area R0 is defined as a first end part RL1. On the other hand, among the longitudinal end parts RL1 and RL2, the longitudinal end part located at far side (downstream side) when viewed from the subject vehicle V1 approaching or passing by the object area R0 is defined as a second end part RL2. The first end part RL1 and the second end part RL2 are located on the boundary of the object area R0.

As illustrated in FIG. 2A, when the vehicle width direction of the subject vehicle is defined as Vw1 (X-axis direction in the figure), the object area R0 has lateral end parts RW1 and RW2 at the right side and left side of the object area R0, respectively. These lateral end parts RW1 and RW2 are end lines (end parts) that define the distance from the subject vehicle V1 along the vehicle width direction. These lateral end parts RW1 and RW2 also represent end lines that define the length (width) of the object area along the road width direction (X) of the travel lane Ln1 for the subject vehicle. The length of the object area R0 illustrated in FIG. 2A along the road width direction (X-axis direction) is W0 that is a distance between the lateral end part RW1 (x1) and the lateral end part RW2 (x2). When the subject vehicle comes close to the avoidance object V2 along the vehicle width direction, among the lateral end parts RW1 and RW2 of the object area R0, the lateral end part located at the side of the subject vehicle V1 when viewed from the subject vehicle V1 is defined as a first lateral end part RW1. On the other hand, among the lateral end parts RW1 and RW2, the lateral end part located at the side (road shoulder side) opposite to the side of the subject vehicle V1 when viewed from the subject vehicle V1 is defined as a second lateral end part RW2. The first lateral end part RW1 and the second lateral end part RW2 are located on the boundary of the object area R0.

FIG. 2A illustrates an exemplary case in which the other vehicle V2 as the avoidance object exists in the travel lane Ln1 for the subject vehicle, but also in cases where the avoidance object exists in a lane other than the travel lane Ln1 for the subject vehicle, an object area can be similarly set for the avoidance object when the subject vehicle V1 should avoid the avoidance object.

When, as illustrated in FIG. 2A, there is another vehicle V3 traveling in the opposite direction in an oncoming lane Ln2 of the travel lane Ln1 for the subject vehicle V1, the other vehicle V3 is detected as an avoidance object. Although not illustrated in the figure, when the other vehicle V3 is detected as an avoidance object, an object area is set within a region that includes the other vehicle V3, in the same manner.

Then, the control device 10 uses the route planning function to plan a target route RT for avoiding the object area R (i.e. for passing by the side of the object area R). A method of planning the target route RT may be as follows. For example, the control device 10 sets one or more target coordinates (traveling points at which the subject vehicle V1 can avoid the object area) on the basis of the object area set for the avoidance object and connects the current position of the subject vehicle V1 with the target coordinate or coordinates, and the target route RT can thereby be obtained.

In one or more embodiments of the present invention, the control device 10 may calculate the target route RT such that the subject vehicle V1 does not enter the object area R set for the avoidance object, may calculate the target route RT such that an area at which the object area R and a possible existence area of the subject vehicle V1 overlap each other is less than a predetermined value, may calculate a sequence of positions separate from the boundary of the object area R by a predetermined distance as the target route RT, or may calculate the boundary itself of the object area R as the target route RT. As previously described, the object area R is set such that the distance between the subject vehicle V1 and the avoidance object does not become less than a predetermined value or such that the distance between the subject vehicle V1 and the avoidance object is maintained at a predetermined threshold. Consequently, the target route RT is also planned at a location at which the distance between the subject vehicle V1 and the avoidance object does not become less than the predetermined value or at a location at which the distance between the subject vehicle V1 and the avoidance object is maintained at the predetermined threshold.

As will be understood, in one or more embodiments of the present invention, one or more target coordinates may be set on the basis of the position or the like of an avoidance object without setting an object area for the avoidance object and the target route RT may be obtained/calculated as the above on the basis of the target coordinate or coordinates. That is, the target route RT for avoiding an avoidance object may be obtained without setting an object area.

In one or more embodiments of the present invention, when the subject vehicle V1 attempts to concurrently avoid other vehicles V2 and V3 as illustrated in FIG. 2A, that is, for example, when avoidance objects exist at the right and left of the subject vehicle V1 in the width direction and are to be concurrently avoided, the control device 10 performs a process as below. That is, the control device 10 takes into account the object area R0 set for the other vehicle V2 and an object area for the other vehicle V3 to determine whether or not a target route RT can be planned which allows the subject vehicle to go by the oncoming other vehicle V3 while avoiding the other vehicle V2 parked. If, hypothetically, a determination is made that a target route RT cannot be planned which allows the subject vehicle V1 to go by the oncoming other vehicle V3 while avoiding the other vehicle V2 parked, the control device 10 commands the vehicle controller 70 of the travel control device 100 to control the braking quantity of each wheel of the subject vehicle V1 using the braking device 81 of the driving device 80 and stops the subject vehicle V1 short of the other vehicle V2 (at the side of −y) to wait for the other vehicle V3 to pass.

Description will now be made to a method in which the control device 10 according to one or more embodiments of the present invention sets the object area in accordance with a margin distance for the subject vehicle V1. The margin distance for the subject vehicle V1 refers to a distance between the subject vehicle V1 and any of lane markers (e.g. white lines, curbstones, center dividers, guardrails, buildings, etc.) existing on a road RD (this distance may strictly be a space between the side surface of the subject vehicle V1 and such a lane marker). The longer the margin distance is, a longer distance is allowed for the subject vehicle V1 to move along the road width direction of the road RD. Therefore, when the subject vehicle V1 is operated to avoid an avoidance object, the passengers of the subject vehicle V1 can get a sense of security and relaxation.

Figure 2B:
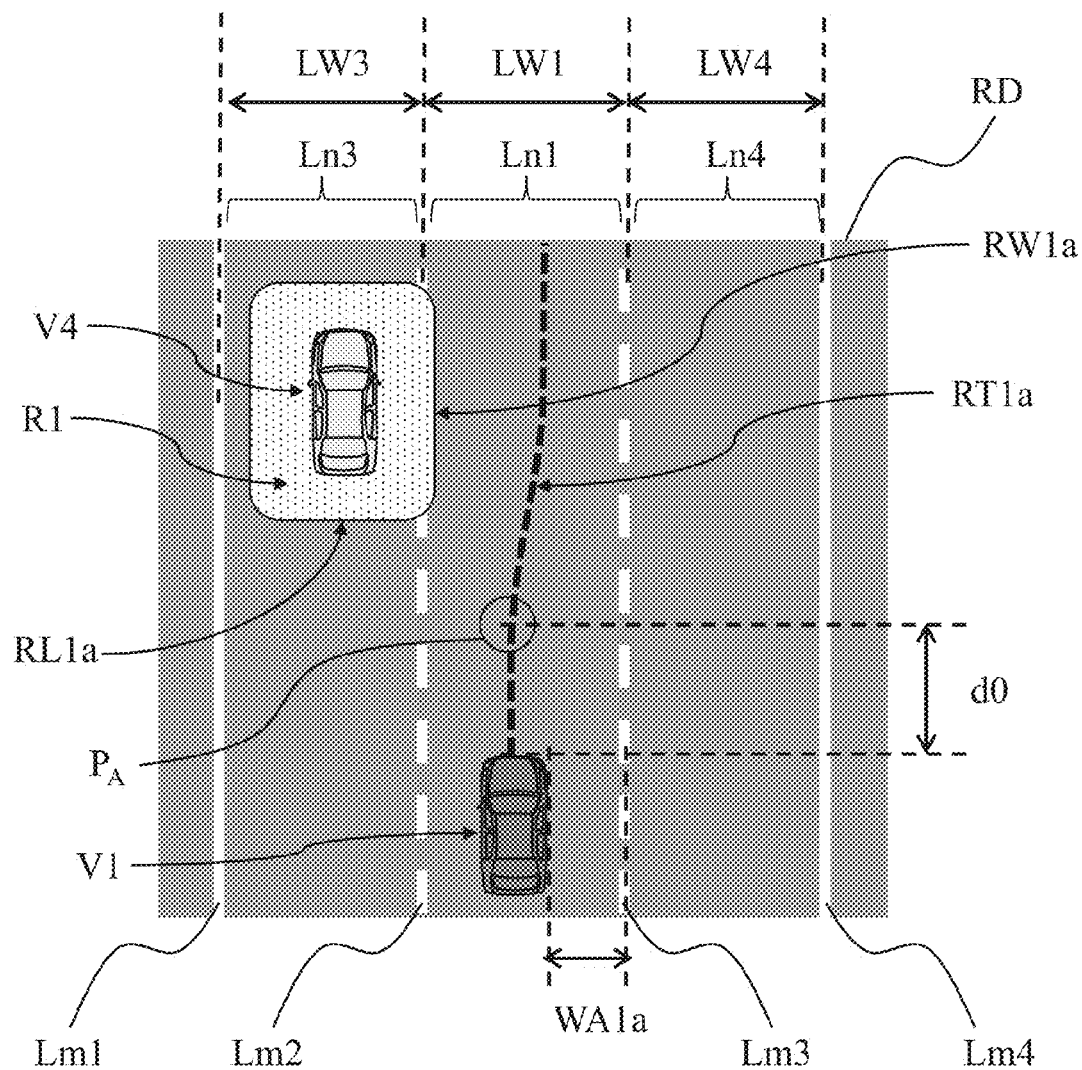
FIG. 2B is a plan view for describing a method of setting the object area when a margin distance is long.
Figure 2C:
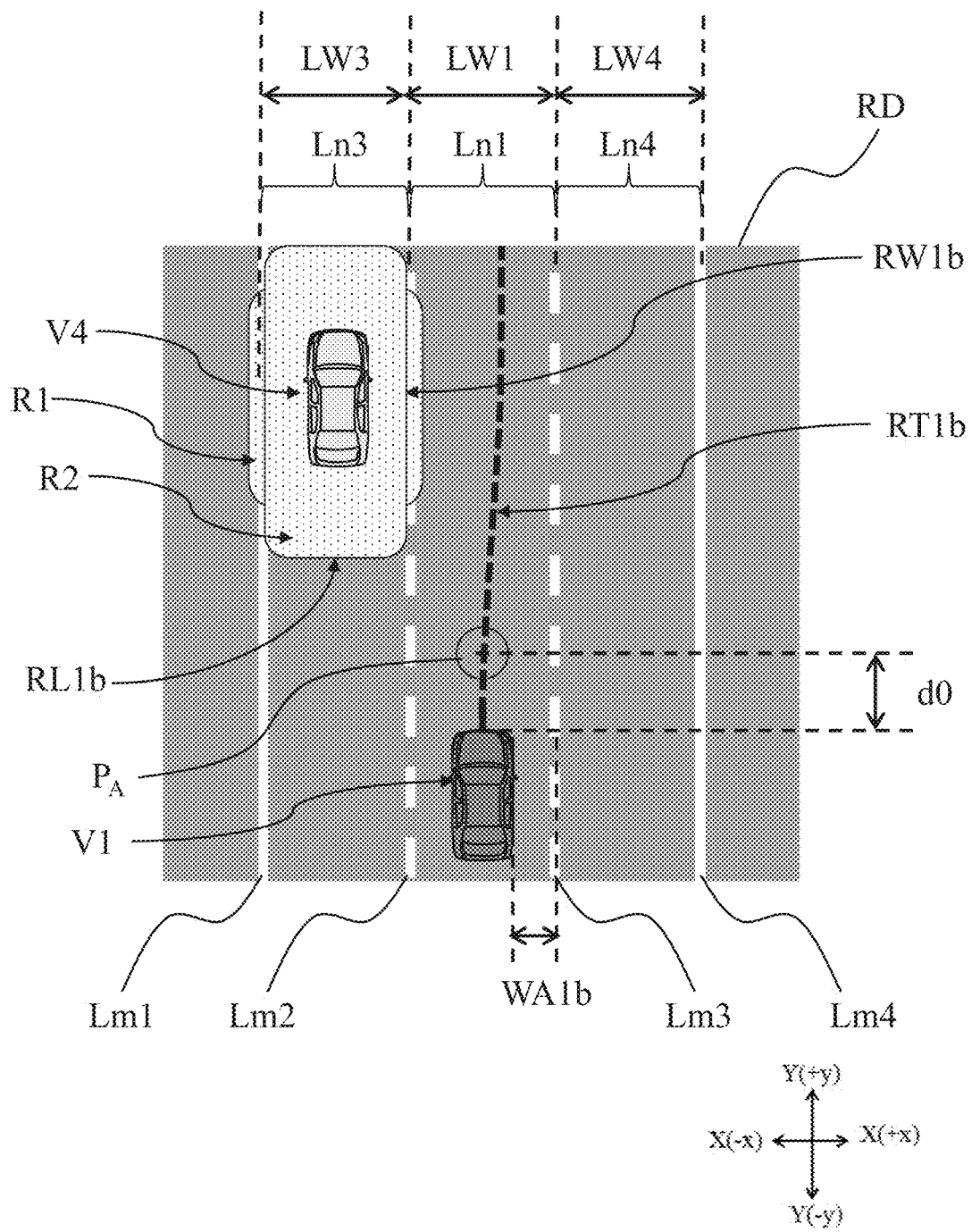
FIG. 2C is a plan view for describing a method of setting the object area when a margin distance is short.

FIG. 2B illustrates a scene in which another vehicle V4 as the avoidance object is traveling in the +y direction in an adjacent lane Ln3 to the left of a travel lane Ln1 for the subject vehicle V1. FIG. 2C illustrates a similar scene to that of FIG. 2B except that the width LW1 of a travel lane Ln1 and the width LW3 of a left-side adjacent lane Ln3 are narrowed compared with those of FIG. 2B. In one or more embodiments of the present invention, the above-described margin distance may be a distance from the subject vehicle V1 to any of lane markers, but FIG. 2B and FIG. 2C each illustrate an example that obtains a distance WA1a or WA1b from the subject vehicle V1 to a lane marker Lm3 of the travel lane Ln1 for the subject vehicle V1.

When, as illustrated in FIG. 2B and FIG. 2C, the distances WA1a and WA1b obtained as the margin distances are different, the control device 10 according to one or more embodiments of the present invention provides object areas R1 and R2 in accordance with the distances WA1a and WA1b as the margin distances in consideration that appropriate sizes and shapes of the object areas to be set for the avoidance objects are different. Here, it is assumed that the margin distance (distance WA1b) in the scene of FIG. 2C is shorter than the margin distance (distance WA1a) in the scene of FIG. 2B (WA1b<WA1a). For descriptive purposes, in FIG. 2C, the object area R2 is illustrated to be superposed on the object area R1 of FIG. 2B.

In one or more embodiments of the present invention, the control device 10 sets, in the scene illustrated in FIG. 2B, an object area R1 that has a first end part RL1a and a first lateral end part RW1a, in accordance with the distance/width WA1a as the margin distance. The first end part RL1a represents a longitudinal position at the near side (−y side) when viewed from the subject vehicle V1. The first lateral end part RW1a represents a lateral position at the side of the subject vehicle V1 (+x side). On the other hand, in the scene illustrated in FIG. 2C, the control device 10 sets an object area R2 that has a first end part RL1b and a first lateral end part RW1b, in accordance with the distance/width WA1b as the margin distance. The first end part RL1b represents a longitudinal position at the near side (−y side) when viewed from the subject vehicle V1. The first lateral end part RW1b represents a lateral position at the side of the subject vehicle V1 (+x side).

In this operation, as illustrated in FIG. 2B and FIG. 2C, the control device 10 sets the first end part RL1b of the object area R2 at the nearer side (−y side) than the first end part RL1a of the object area R1. That is, in the scene of FIG. 2C in which the margin distance is shorter, the control device 10 elongates the object area set for the avoidance object toward the near side (−y side) when viewed from the subject vehicle V1. In addition, as illustrated in FIG. 2B and FIG. 2C, the control device 10 sets the first lateral end part RW1b of the object area R2 at the side of the other vehicle V4 (−x side) in the road width direction compared with the first lateral end part RW1a of the object area R1. That is, in the scene of FIG. 2C in which the margin distance is shorter, the control device 10 reduces the object area set for the avoidance object toward the side of the other vehicle V4 (−x side) in the road width direction. Thus, in one or more embodiments of the present invention, the target route can be planned on the basis of the object area which is determined in response to the margin distance. As a result, an appropriate target route can be planned in accordance with the margin distance.

Through this operation, in the scene of FIG. 2C in which the margin distance is shorter, the target route is planned on the basis of the object area such that a turning point $P_A$ that represents the timing to avoid the avoidance object is set at the nearer side (−y side) compared with the scene of FIG. 2B to reduce the distance d0 between the turning point $P_A$ and the subject vehicle V1, and the timing to start avoidance of the avoidance object becomes early in the subject vehicle V1 traveling along the target route RT1a. In other words, the subject vehicle starts to turn from the nearer side and therefore the subject vehicle is to travel with a certain space in the width direction when having approached the other vehicle V4. Thus, in one or more embodiments of the present invention, even when the margin distance for the subject vehicle V1 is short, an uncomfortable feeling given to the passengers can be mitigated when performing travel control for the subject vehicle V1.

Moreover, according to one or more embodiments of the present invention, in the scene of FIG. 2C in which the margin distance is shorter, the target route is planned closer to the side of the other vehicle V4 (−x side) compared with the scene of FIG. 2B. That is, the target route is planned such that, in the vicinity of the other vehicle V4 as the avoidance object, the trajectory of the target route passes by the other vehicle V4 at a location nearer to the other vehicle V4 to reduce the amount that the subject vehicle V1 traveling on the target route deviates along the road width direction. In other words, when the margin distance for the subject vehicle V1 is short as illustrated in FIG. 2C, the space in the width direction from the subject vehicle V1 to the right-side lane marker is narrow and therefore the subject vehicle V1 travels so as not to go beyond the lane marker but with a certain space in the width direction to the other vehicle V4 at the left side. Thus, in one or more embodiments of the present invention, even when the margin distance for the subject vehicle V1 is short, an uncomfortable feeling given to the passengers can be mitigated when performing travel control for the subject vehicle V1.

Furthermore, according to one or more embodiments of the present invention, the margin distance used to plan the target route is the distance between the lane marker Lm3 and the right-side surface of the subject vehicle V1 and therefore an uncomfortable feeling given to the passengers can be more appropriately mitigated when performing travel control for the subject vehicle V1.

This will be more specifically described. When, as illustrated in FIG. 2B, the subject vehicle V1 is operated to avoid the other vehicle V4, the subject vehicle V1 on the target route RT1a is to move in a direction (+x) of deviating from the other vehicle V4 along the road width direction. Here, when the distance between the lane marker Lm3 of the travel lane Ln1 and the subject vehicle V1 is short, the distance in which the subject vehicle V1 in the travel lane Ln1 can move in the direction (+x) of deviating from the other vehicle V4 is short. Therefore, if, in such a case, the timing when the subject vehicle V1 deviates from the other vehicle V4 gets delayed, the passengers may be given an uncomfortable feeling, such as due to abrupt steering.

In one or more embodiments of the present invention, however, the distance between the lane marker Lm3 and the right-side surface of the subject vehicle V1 is obtained as the margin distance, and the target route is planned such that, the shorter the margin distance is, the timing when the subject vehicle V1 deviates from the other vehicle V4 is set earlier (i.e. the distance d0 between the above-described turning point $P_A$ and the subject vehicle V1 is set shorter). This operation allows the subject vehicle V1 to start turning from the nearer side and travel straight ahead with a certain space in the width direction when having approached the other vehicle V4 and when passing by the other vehicle V4. Therefore, an uncomfortable feeling given to the passengers can be more appropriately mitigated when performing travel control for the subject vehicle V1.

As a specific method of obtaining the distance between the lane marker Lm3 and the subject vehicle V1, a method can be used in which the onboard apparatus 200 acquires a captured image around the subject vehicle V1 using the camera 51 or the like of the detection device 50, performs image processing of the captured image to detect the lane marker Lm3, and calculates a distance WA1 from the lane marker Lm3 to the right-side surface of the subject vehicle V1 along the road width direction.

Figure 3:
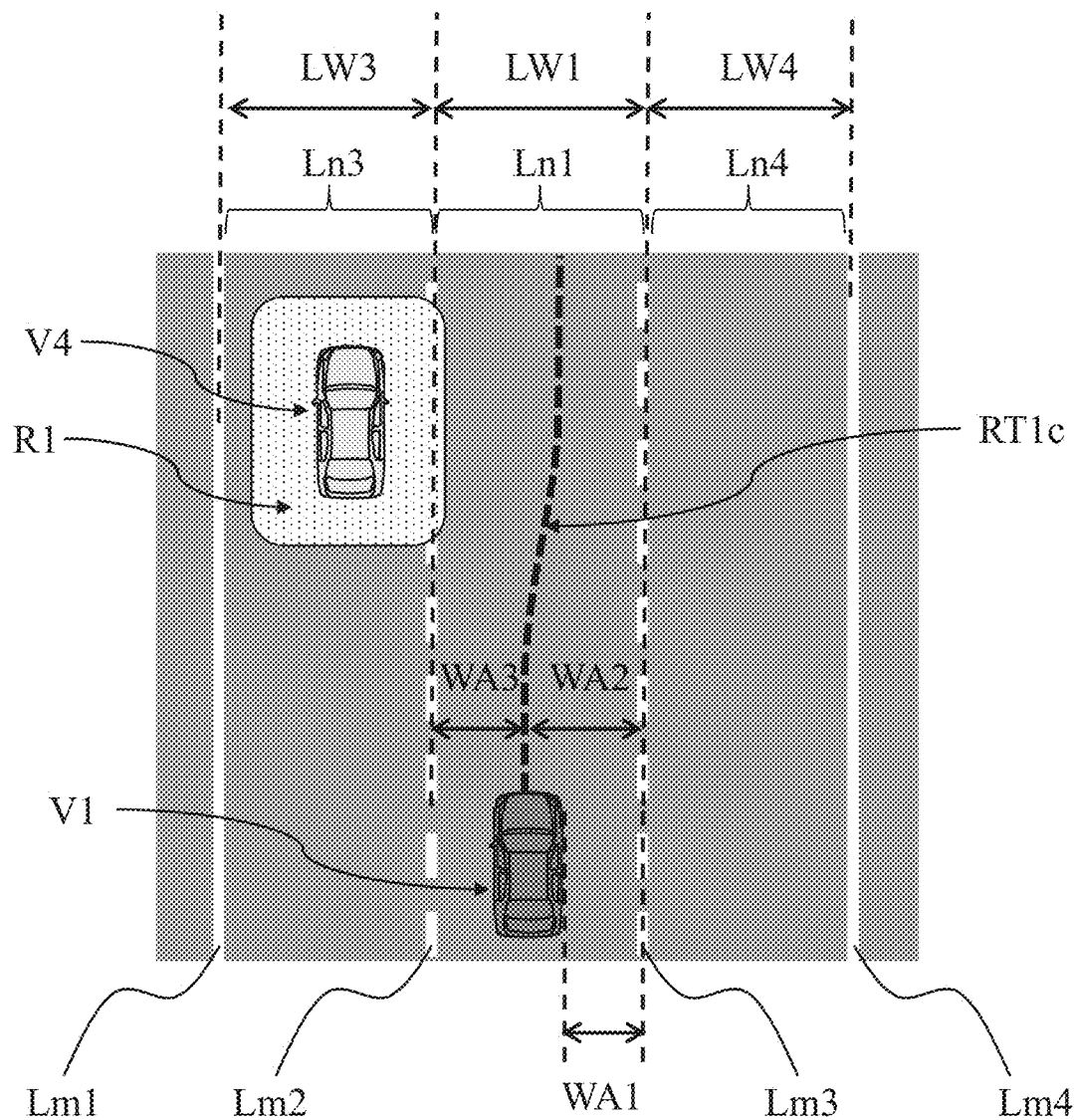
FIG. 3 is a plan view for describing a margin distance.

In addition or alternatively, as a method of obtaining the distance WA1 between the lane marker Lm3 and the subject vehicle V1, a method can be used in which, as illustrated in FIG. 3, the control device 10 obtains a distance WA2 from a target route RT1c planned in accordance with the avoidance object to the lane marker Lm3 and calculates the distance WA1 on the basis of the distance WA2 with consideration for the vehicle width or the like of the subject vehicle V1. In addition or alternatively, as a method of obtaining the distance WA1 between the lane marker Lm3 and the subject vehicle V1, a method can be used in which the distance WA1 is calculated on the basis of the width LW1 of the travel lane Ln1 with consideration for the position or the like of the subject vehicle V1 in the travel lane Ln1. Through such an operation, even when the distance WA1 between the lane marker Lm3 and the subject vehicle V1 cannot be directly measured by the camera 51 or the like, the distance WA1 can be appropriately calculated.

As the above, the control device 10 uses the setting function to set the object area in accordance with the margin distance for the subject vehicle V1.

In the above-described examples of FIG. 2B and FIG. 2C, the margin distance is obtained as the distance WA1a or WA1b between the lane marker Lm3 of the travel lane Ln1 and the subject vehicle V1, but the margin distance may be a distance between another lane marker existing on the road RD and the subject vehicle V1.

Figure 4:
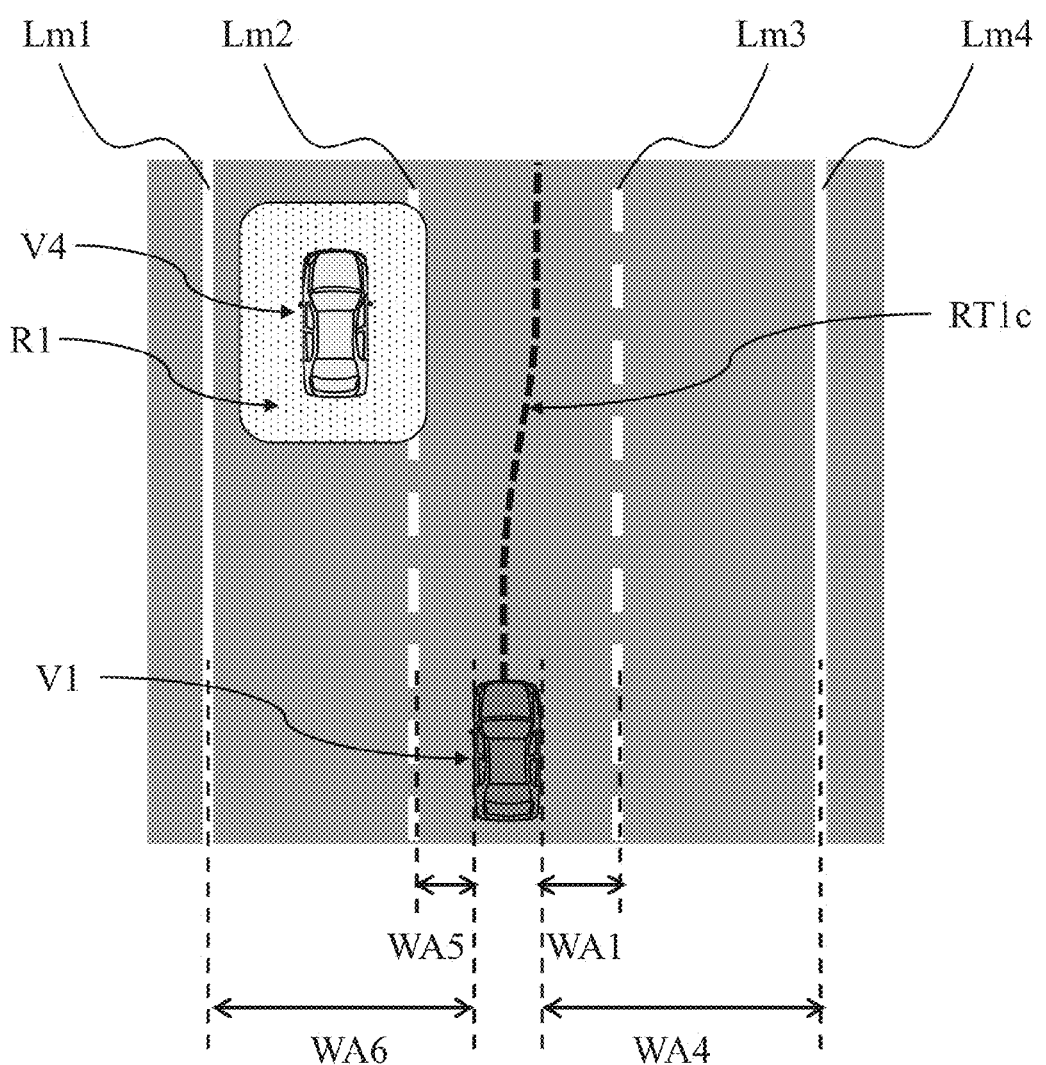
FIG. 4 is a plan view for describing an example of a method of obtaining the margin distance.

For example, as illustrated in FIG. 4, the margin distance may be obtained as a distance WA4 from the right-side surface of the subject vehicle V1 to the lane marker Lm4, as a distance WA5 from the left-side surface of the subject vehicle V1 to the lane marker Lm2, or as a distance WA6 from the left-side surface of the subject vehicle V1 to the lane marker Lm1.

According to one or more embodiments of the present invention, when the margin distance is obtained as any of such distances WA4, WA5 and WA6, the target route is planned such that, the shorter the margin distance is, the distance d0 between the turning point $P_A$ and the subject vehicle V1 is set shorter to advance the timing when the subject vehicle V1 traveling on the target route starts avoidance of the avoidance object. Thus, in one or more embodiments of the present invention, even when the margin distance for the subject vehicle V1 is short, an uncomfortable feeling given to the passengers can be mitigated when performing travel control for the subject vehicle V1.

As a method of obtaining such a distance WA4, WA5 or WA6, a method can be used in which the camera 51 or the like of the detection device 50 is used for image processing as in the above-described method of obtaining the distance WA1 between the lane marker Lm3 and the subject vehicle V1.

In addition or alternatively, as a method of obtaining such a distance WA4, WA5 or WA6, a method can be used in which the distance is calculated, as illustrated in FIG. 3, on the basis of the distance WA3 from the target route RT1c to the lane marker Lm2 or the distance WA2 from the target route RT1c to the lane marker Lm3. In addition or alternatively, a method may also be used in which the distance is calculated, as illustrated in FIG. 3, on the basis of the width LW3 of the travel lane Ln3 or the width LW4 of the travel lane Ln4.

Figure 5A:
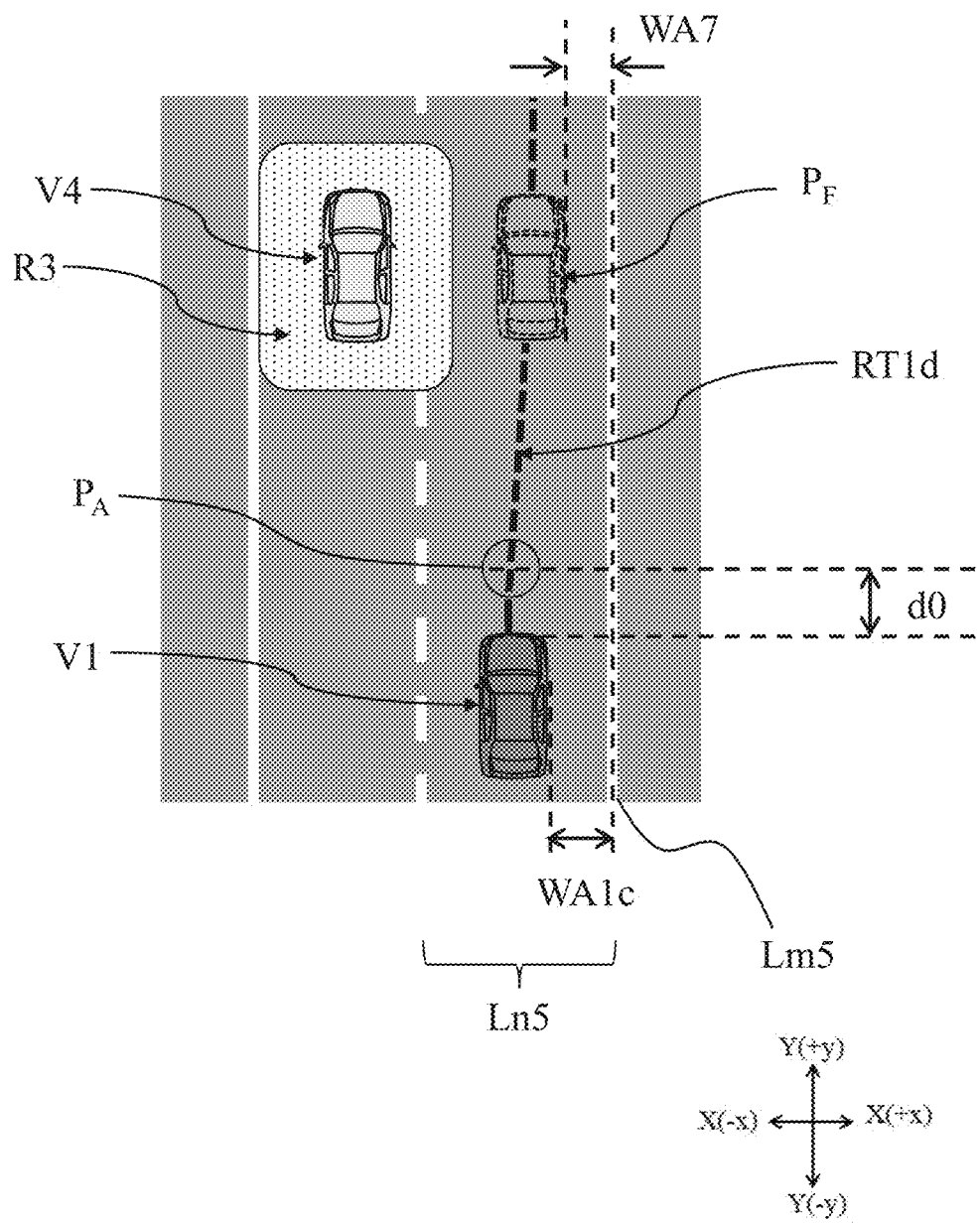
FIG. 5A is a plan view for describing an example of a method of obtaining the margin distance.
Figure 5B:
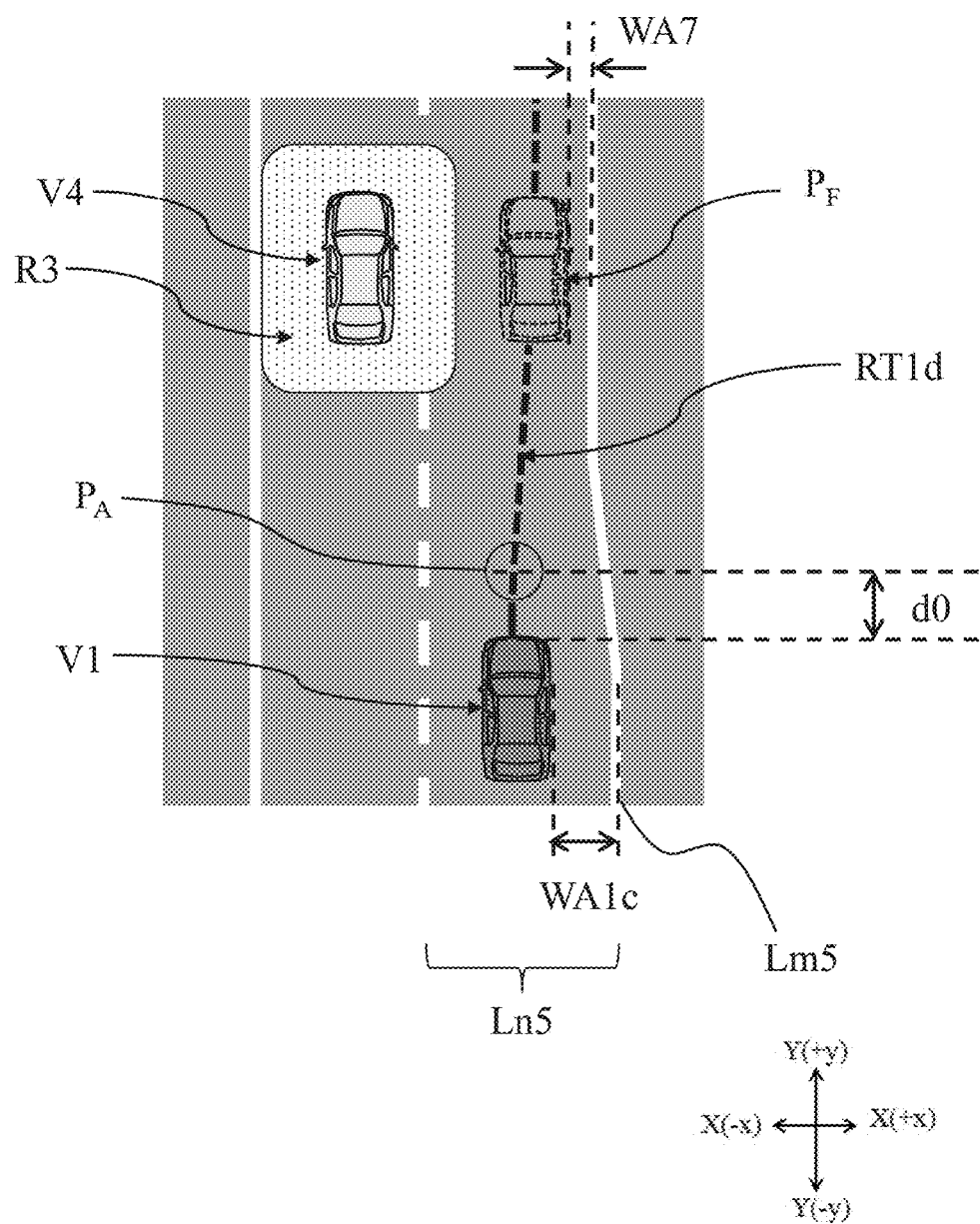
FIG. 5B is a plan view for describing another example of a method of obtaining the margin distance.

In the above-described examples, the margin distance is obtained as the distance WA1 from the subject vehicle V1 to the lane marker Lm3, as illustrated in FIG. 3, with reference to the current position of the subject vehicle V1. In one or more embodiments of the present invention, the margin distance to use may be obtained as a distance from the lane marker to a point (passing point $P_F$) at which, as illustrated in FIG. 5A and FIG. 5B, the subject vehicle V1 travels on the target route and is expected to overtake or pass by the avoidance object. FIG. 5A and FIG. 5B each illustrate a case of so-called "passing" in which the subject vehicle V1 gets ahead of the other vehicle V4 without changing lanes, and the point $P_F$ is accordingly referred to as a "passing point," but the same applies to a case of so-called "overtaking" in which the subject vehicle V1 changes lanes and gets ahead of the other vehicle V4.

Specifically, as illustrated in FIG. 5A, the control device 10 according to one or more embodiments of the present invention plans a target route RT1d as a provisional target route on the basis of the other vehicle V4 as the avoidance object and can then obtain the margin distance as a distance WA7 between the subject vehicle V1 and a lane marker Lm5 when the subject vehicle V1 is assumed to travel on the provisional target route RT1d and locate at a point (passing point $P_F$) at which the subject vehicle V1 overtakes or passes by the other vehicle V4. Through this operation, when the width of the travel lane Ln5 in which the subject vehicle V1 is traveling narrows in the vicinity of the passing point $P_F$, as illustrated in FIG. 5B, or in similar cases, the control device 10 can newly plan an appropriate target route in accordance with the margin distance (distance WA7) at the passing point $P_F$, and an uncomfortable feeling given to the passengers can be more appropriately mitigated when performing travel control for the subject vehicle V1.

Figure 6:
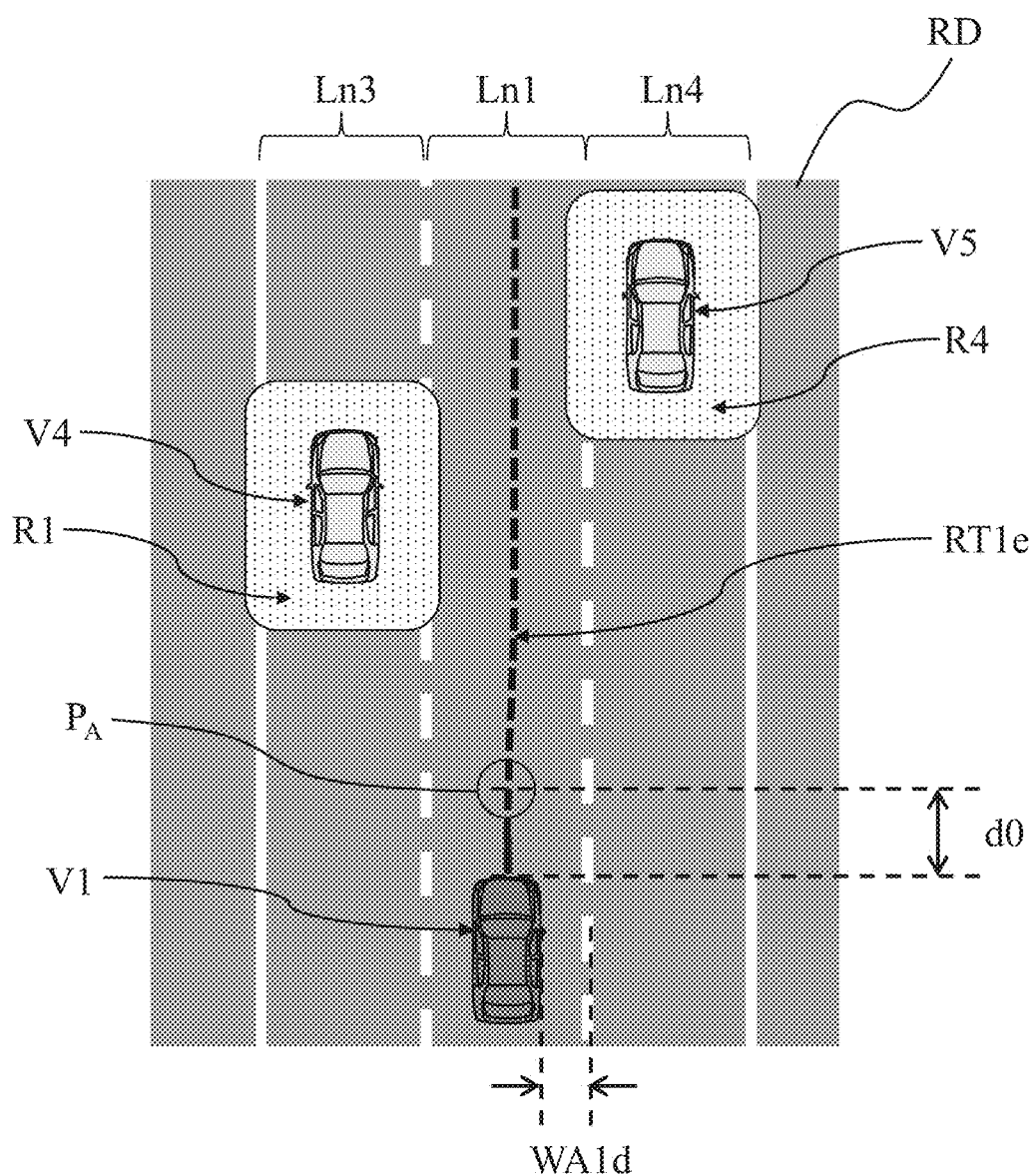
FIG. 6 is a plan view for describing a method of planning a target route when a plurality of avoidance objects exists.

According to one or more embodiments of the present invention, when the control device 10 attempts to avoid an avoidance object, but detects another avoidance object different from that avoidance object, the control device 10 can take another such avoidance object into account to plan the target route. Here, FIG. 6 illustrates a case in which, in addition to the other vehicle V4 traveling in the travel lane Ln3, another vehicle V5 traveling in the travel lane Ln4 is detected as an avoidance object ahead the other vehicle V4. In FIG. 6, the subject vehicle V1, other vehicle V4 and other vehicle V6 are all traveling in the +y direction. In the scene illustrated in FIG. 6, the control device 10 first obtains a target route RT1e for avoiding the other vehicle V4 which exists at the nearer position from the subject vehicle V1. In this operation, the control device 10 takes into account that the other vehicle V5 exists as an avoidance object in addition to the other vehicle V4, and plans the target route RT1e so as to reduce the distance d0 between the turning point $P_A$ and the subject vehicle V1 to advance the timing of operating the subject vehicle V1 to turn. In this operation, in order that the subject vehicle V1 does not unduly come close to the other vehicle V5 as another avoidance object, the control device 10 can further plan the target route RT1e to have a trajectory on which the subject vehicle V1 passes a nearer position to the other vehicle V4, that is, to reduce the distance between the target route RT1e and the other vehicle V4 along the road width direction. This operation allows an appropriate target route to be planned with consideration for each avoidance object when the subject vehicle V1 attempts to avoid an avoidance object and another avoidance object is detected. As will be understood, one avoidance object may be treated as the above, but the number of such other vehicles may be two or more.

FIG. 6 illustrates an example in which the other vehicle V5 is detected as another such avoidance object, but another such avoidance object may also be a moving object other than vehicles or a stationary object, such as road structures.

Further, even when another avoidance object as the above does not actually exist, the higher the possibility that another avoidance object appears around the subject vehicle V1 is, the control device 10 according to one or more embodiments of the present invention can plan a target route so as to obtain an earlier timing of starting avoidance of the avoidance object and make smaller the amount that the subject vehicle V1 deviates along the road width direction. For example, in the above-described scene as illustrated in FIG. 2A in which the right side of the travel lane Ln1 for the subject vehicle V1 is the oncoming lane Ln2, even when another avoidance object, such as the other vehicle V3 does not exist in the oncoming lane Ln2 at the present moment, the control device 10 determines, at the time of planning a target route RT1 for avoiding the other vehicle V2, that the possibility that an avoidance object (oncoming vehicle) appears in the oncoming lane Ln2 is high, and adjusts the target route RT1 in consideration of the existence of the oncoming lane Ln2. That is, the control device 10 plans the target route RT1 so as to reduce the distance d0 between the turning point $P_A$ and the subject vehicle V1 as in the case of the target route RT1e illustrated in FIG. 6 and further plans the target route RT1 to have a trajectory that passes a nearer position to the other vehicle V2 in order that the subject vehicle V1 does not unduly come close to the oncoming lane Ln2. Through this operation, according to one or more embodiments of the present invention, when the subject vehicle V1 is operated to avoid an avoidance object, the target route can be planned with consideration for the possibility that another avoidance object appears, and an uncomfortable feeling given to the passengers can thus be more appropriately mitigated when performing travel control for the subject vehicle V1.

Figure 7:
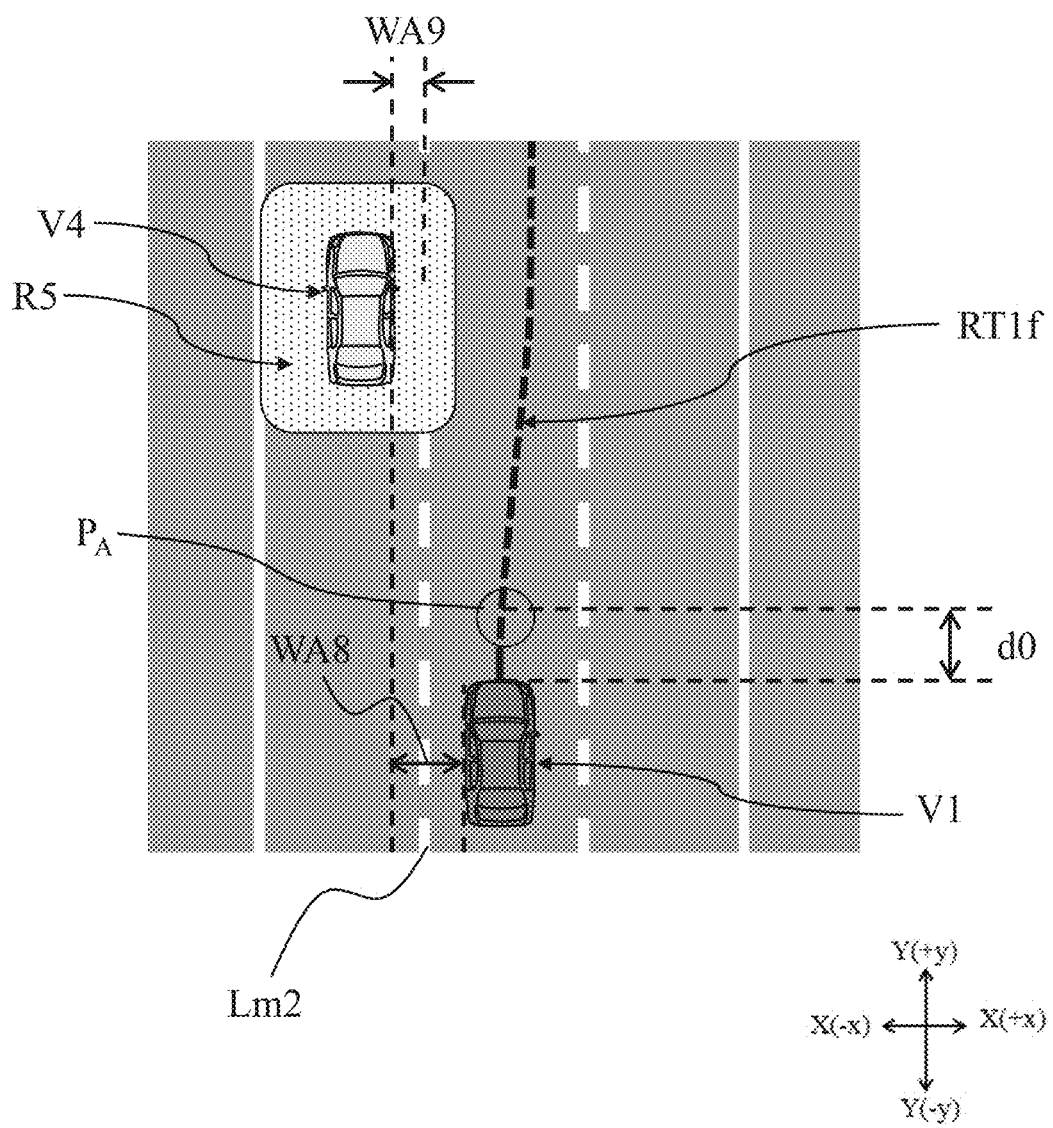
FIG. 7 is a plan view for describing an example of a method of planning a target route in accordance with the distance between an avoidance object and the subject vehicle.

Furthermore, according to one or more embodiments of the present invention, when the other vehicle V4 as an avoidance object exists as illustrated in FIG. 7, the shorter the distance WA8 between the subject vehicle V1 and the other vehicle V4 in the road width direction is, the target route is planned to more advance the timing of starting avoidance of the avoidance object, and the amount that the subject vehicle V1 deviates along the road width direction can be increased.

In the scene illustrated in FIG. 7, the other vehicle V4 is close to the lane marker Lm2 at the side of the subject vehicle V1 and, accordingly, the distance WA9 between the other vehicle V4 and the lane marker Lm2 is short. This results in a short distance WA8 between the subject vehicle V1 and the other vehicle V4 in the road width direction. In such a case, the shorter the distance WA8 between the subject vehicle V1 and the other vehicle V4 in the road width direction is, the control device 10 plans a target route RT1f so as to more reduce the distance d0 between the turning point $P_A$ and the subject vehicle V1 and further plans the target route RT1f to have a trajectory that passes a farther position from the other vehicle V2. Through this operation, as the subject vehicle V1 and the other vehicle V4 are closer to each other in the road width direction, the timing of starting avoidance of the avoidance object is more advanced so that the subject vehicle V1 can deviate from the other vehicle V4, and an uncomfortable feeling given to the passengers can thus be more mitigated.

Figure 8:
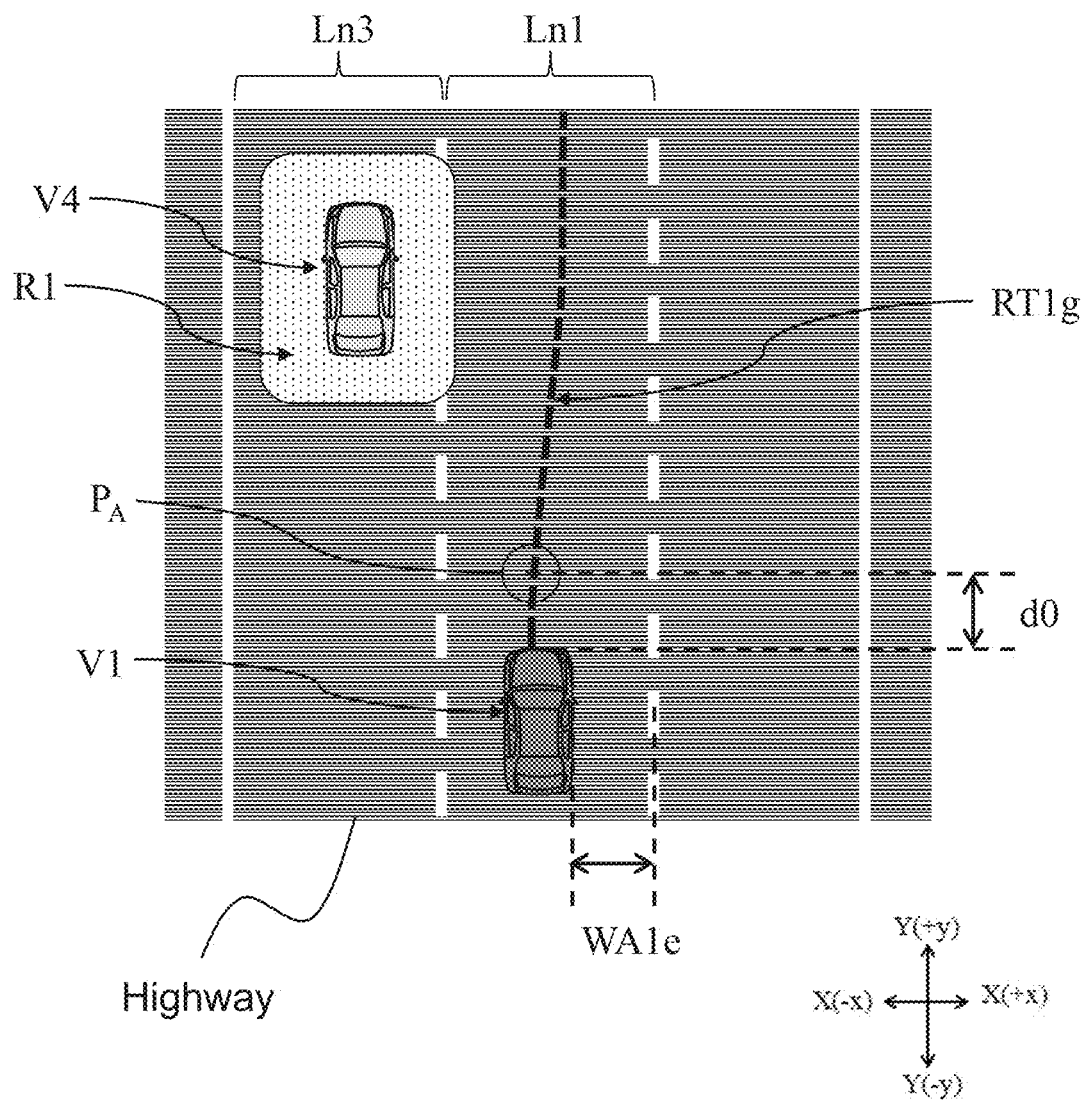
FIG. 8 is a plan view for describing an example of a method of planning a target route in accordance with the type of a road on which the subject vehicle is traveling.

In one or more embodiments of the present invention, the control device 10 may adjust the target route to be planned, in accordance with the road type of a road RD on which the subject vehicle V1 is traveling. For example, as illustrated in FIG. 8, when the road type of a road on which the subject vehicle V1 is traveling is a highway, the control device 10 plans a target route RT1g to have a reduced distance d0 between the turning point $P_A$ and the subject vehicle V1 compared with the case where the subject vehicle V1 is traveling on a general road. Through this planning, when the subject vehicle V1 is estimated to be traveling at a high speed, the subject vehicle V1 starts turning from the nearer side and therefore travels straight ahead with a certain space in the width direction when having approached the other vehicle V4 and when overtaking or passing by the other vehicle V4. In this case, the control device 10 plans the target route RT1g to have a trajectory that passes a nearer position to the other vehicle V4 (to reduce the distance between the target route RT1g and the other vehicle V4 in the road width direction). This operation suppresses the lateral deviation of the subject vehicle V1 in the road width direction when the subject vehicle V1 is estimated to be traveling at a high speed, thus preventing abrupt steering. As the above, a target route can be planned in accordance with the road type of a road on which the subject vehicle V1 is traveling, and an uncomfortable feeling given to the passengers can thus be more appropriately mitigated when performing travel control for the subject vehicle V1.

Here, road types can be classified, for example, into general roads other than national roads, national roads, exclusive roads for vehicles other than highways, in-city highways, intercity highways, etc. in accordance with the features of roads. Such classification allows the control device 10 to increase the amount of adjusting the target route on "general roads other than national roads," "national roads," "exclusive roads for vehicles other than highways," "in-city highways," and "intercity highways" in this order. This is because, on a road on which the traveling speed of the subject vehicle V1 tends to be higher, an uncomfortable feeling given to the passengers can be more mitigated by advancing the timing to start avoidance of an avoidance object and reducing the amount of deviation of the subject vehicle V1 along the road width direction. That is, when the road type of the road on which the subject vehicle is traveling is the "intercity highways," the control device 10 plans the target route to have the shortest distance d0 between the turning point $P_A$ and the subject vehicle V1 and further plans the target route to have a trajectory that passes the nearest position to the avoidance object. On the other hand, when the road type of the road on which the subject vehicle is traveling is the "general roads other than national roads," the control device 10 plans the target route to have the longest distance d0 between the turning point $P_A$ and the subject vehicle V1 and further plans the target route to have a trajectory that passes the farthest position from the avoidance object.

In addition or alternatively, road types may be classified into roads of an average speed of lower than 40 km/h, roads of an average speed of 40 km/h or higher and lower than 60 km/h, roads of an average speed of 60 km/h or higher and lower than 80 km/h, roads of an average speed of 80 km/h or higher, etc. on the basis of information on an average value of speeds when unspecified vehicles travel. In this case, as the average speed on the road on which the subject vehicle V1 is traveling increases, the control device 10 plans a target route so as to reduce the distance d0 between the turning point $P_A$ and the subject vehicle V1 and further plans the target route to have a trajectory that passes a nearer position to the avoidance object.

Next, the control function of the control device 10 will be described. The control device 10 according to one or more embodiments of the present invention outputs command information for driving the subject vehicle V1 on the target route RT to the vehicle controller 70, driving device 80, and steering device 90.

Acquiring the command information from the control device 10, the vehicle controller 70 according to one or more embodiments of the present invention controls the driving device 80 and steering device 90 to drive the subject vehicle V1 along the target route RT. The vehicle controller 70 performs control of the steering device 90 such that the subject vehicle travels while maintaining a certain lateral position to the lane, using the road shape detected by the detection device 50, the road information 122 from the navigation device 120, and a lane marker model stored in the map information 123. The vehicle controller 70 calculates a steering control amount on the basis of the steering angle acquired from the steering angle sensor 61, the vehicle speed acquired from the vehicle speed sensor 62, and information on the current for a steering actuator and sends a current command to the steering actuator to perform the control such that the subject vehicle travels at a target lateral position. The method of controlling the lateral position of the subject vehicle V1 is not limited to using the above-described steering device 90. In addition or alternatively, the driving device 80 and/or the braking device 81 may be used to control the travel direction (i.e. lateral position) of the subject vehicle V1 on the basis of the rotational speed difference between the right and left drive wheels. In this sense, the "turning" of a vehicle is intended to encompass the cases of using the driving device 80 and/or the braking device 81 in addition to the cases of using the steering device 90.

Finally, the presentation function of the control device 10 according to one or more embodiments of the present invention will be described. The control device 10 calculates information in accordance with the object information, information in accordance with the location of the object area R, information in accordance with the location of the target route, and information in accordance with the command information for driving the subject vehicle on the target route and sends the calculated information to the output device 110, which then outputs it to the external in the above-described form.

Figure 9:
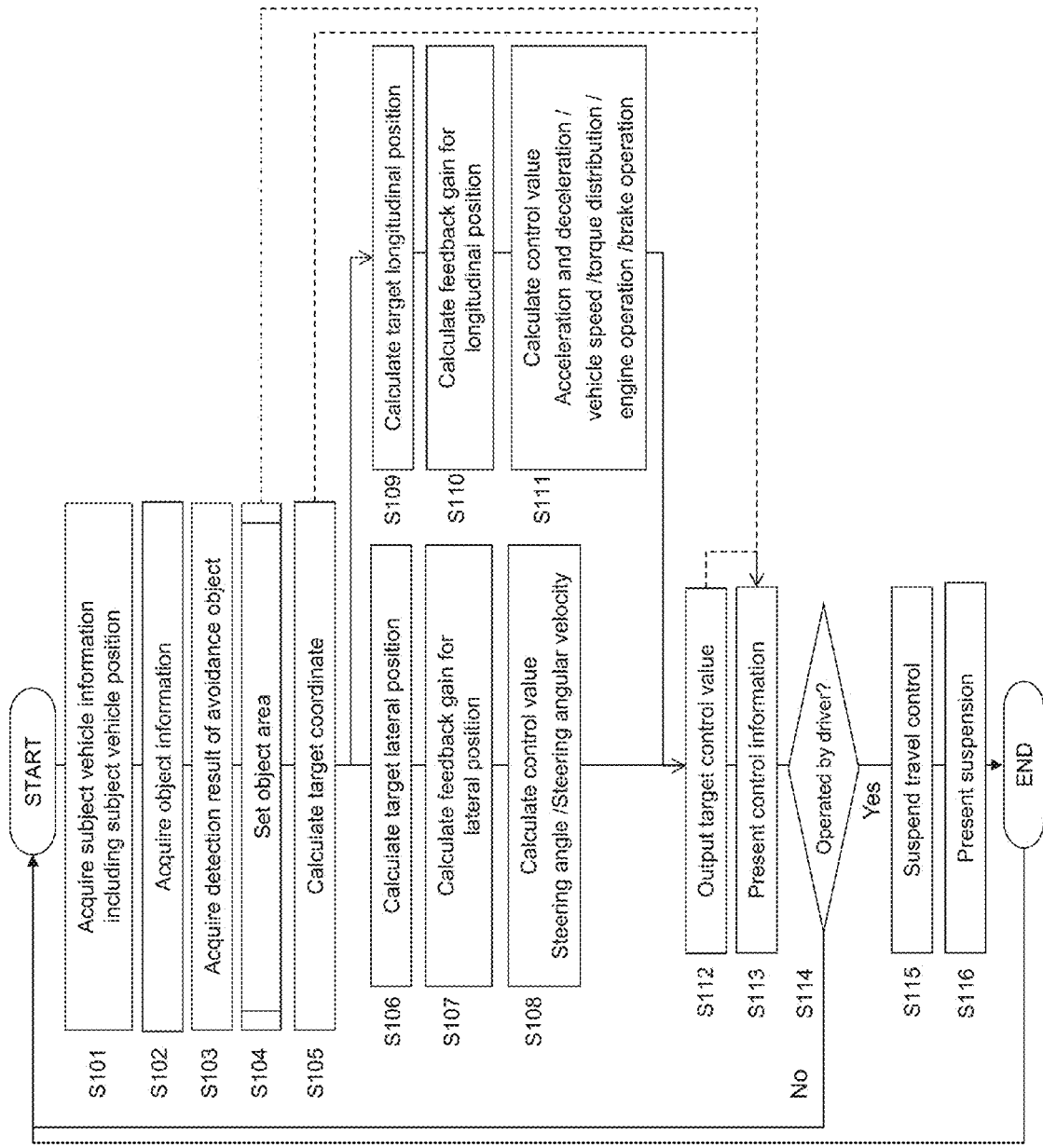
FIG. 9 is a flowchart illustrating a control procedure of a travel control device according to one or more embodiments of the present invention.

A control procedure in the travel control device 100 according to one or more embodiments of the present invention will then be described with reference to the flowcharts of FIGS. 9 and 10. The contents of the process in each step are as described above and the flow of the process will be mainly described below.

First, the procedure of the travel control as a whole will be described with reference to FIG. 9.

In step S101, the control device 10 acquires subject vehicle information that includes at least the position of the subject vehicle V1. The subject vehicle information may further include the vehicle speed and/or acceleration of the subject vehicle V1. In step S102, the control device 10 acquires object information that includes the position of an avoidance object which the subject vehicle V1 should avoid. The object information may further include the speed and/or acceleration of the avoidance object.

In step S103, the control device 10 acquires a detection result of the avoidance object from the detection device 50. The detection result of the avoidance object includes information on the position of the avoidance object. In step S104, the control device 10 sets an object area R in accordance with the position of the avoidance object. A subroutine of the setting process for the object area R will be described using FIG. 10.

In step S105, the control device 10 calculates a target route RT for avoiding the object area R. The target route RT includes one or more target coordinates at which the subject vehicle V1 is to travel. Each target coordinate includes a target lateral position (target X-coordinate) and a target longitudinal position (target Y-direction). The target route RT is obtained by connecting the calculated one or more target coordinates and the current position of the subject vehicle V1. A method of calculating the target coordinates (target route RT) illustrated in step S105 will be described later.

In step S106, the control device 10 acquires the target lateral position or positions of the target coordinate or coordinates calculated in step S105. In step S107, the control device 10 compares the current lateral position of the subject vehicle V1 with the target lateral position or positions acquired in step S106 and calculates a feedback gain for the lateral position on the basis of the comparison result.

In step S108, the control device 10 calculates a target control value on the basis of the actual lateral position of the subject vehicle V1, the target lateral position corresponding to the current position, and the feedback gain of step S107. The target control value relates to a steering angle, steering angular velocity and other necessary parameters for moving the subject vehicle V1 on the target lateral position. In step S112, the control device 10 outputs the target control value to the onboard apparatus 200. This allows the subject vehicle V1 to travel on the target route RT which is defined by the target lateral position. When a plurality of target coordinates is calculated in step S105, the process of steps S106 to S112 are repeated every time the target lateral position is acquired, and the control value for each target lateral position acquired is output to the onboard apparatus 200.

In step S109, the control device 10 acquires the target longitudinal position or positions of the one or more target coordinates calculated in step S105. In step S110, the control device 10 compares the current longitudinal position and the vehicle speed and acceleration at the current position of the subject vehicle V1 with the target longitudinal position corresponding to the current longitudinal position and the vehicle speed and acceleration at the target longitudinal position and calculates a feedback gain for the longitudinal position on the basis of the comparison result. In step S111, the control device 10 calculates a target control value for the longitudinal position on the basis of the vehicle speed and acceleration corresponding to the target longitudinal position and the feedback gain for the longitudinal position calculated in step S110. As in the previously-described steps S106 to S108 and S112, the process of steps S109 to S112 are repeated every time the target longitudinal position is acquired, and the control value for each target longitudinal position acquired is output to the onboard apparatus 200.

Here, the target control value for the longitudinal position (in the longitudinal direction) refers to a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve the acceleration, deceleration and vehicle speed corresponding to the target longitudinal position. For example, in an engine car, the control function is used to calculate a target amount of intake air (target opening degree of the throttle valve) and a target amount of fuel injection on the basis of calculated values of the current and target acceleration, deceleration and vehicle speed and send them to the driving device 80. Alternatively, the control function may be used to calculate the acceleration, deceleration and vehicle speed and send them to the vehicle controller 70, which may calculate a control value for each of the operation of drive mechanism (which includes the operation of an internal-combustion engine in the case of an engine car and the operation of an electric motor in the case of an electric car and further includes the torque distribution for an internal-combustion engine and electric motor in the case of a hybrid car) and the braking operation to achieve these acceleration, deceleration and vehicle speed.

The routine then proceeds to step S112 in which the control device 10 outputs the target control value for the longitudinal position (in the longitudinal direction) calculated in step S111 to the onboard apparatus 200. The vehicle controller 70 executes the steering control and drive control to operate the subject vehicle to travel on the target route RT which is defined by the target lateral position and target longitudinal position.

In step S113, the control device 10 controls the output device 110 to present information. The information presented by the output device 110 may be the information on the object area set in step S104, the shape of target route calculated in steps S105 to S111, or the target control value output to the onboard apparatus 200 in step S112.

In step S114, a determination is made as to whether the driver intervenes in the operation, such as whether the driver performs the steering operation. When the operation by the driver is not detected, the routine returns to step S101, from which the setting of a new object area, calculation of target route, and travel control are repeated. On the other hand, when the operation by the driver is detected, the routine proceeds to step S115, in which the travel control is suspended. Step S115 is followed by step S116, in which presentation of information is made that the travel control is suspended.

Figure 10:
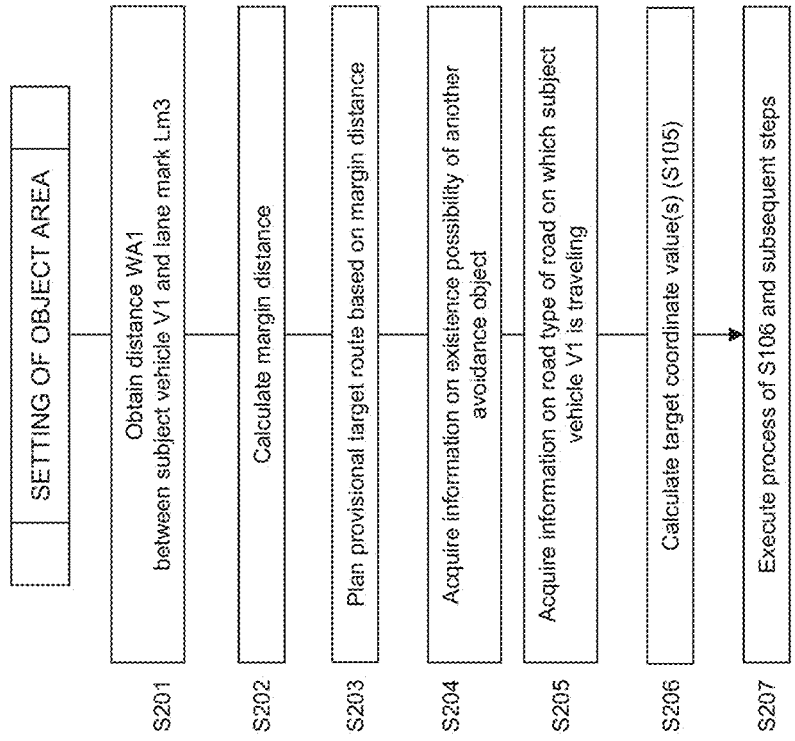
FIG. 10 is a flowchart illustrating a subroutine of step S104 of FIG. 9.

Referring now to the flowchart of FIG. 10, a subroutine of the setting process for an object area (S104 of FIG. 9) is illustrated. This subroutine is executed by the travel control device 100 according to one or more embodiments of the present invention.

After acquiring the subject vehicle information and object information (step S103), the control device 10 obtains, in step S201, the distance WA1 between the subject vehicle V1 and the lane marker Lm3 at the current position of the subject vehicle V1, as illustrated in FIG. 3.

In step S202, the control device 10 sets the distance WA1 as a margin distance on the basis of the information acquired in step S201.

In step S203, the control device 10 plans a provisional target route RT in accordance with the margin distance set in step S202. For example, the control device 10 sets an object area for an avoidance object on the basis of the margin distance and then obtains a target route RT for avoiding the avoidance object, as described above with reference to FIGS. 2A to 2C.

In step S204, the control device 10 acquires information on the possibility that another avoidance object exists other than the avoidance object informed in step S103. For example, the control device 10 can use the camera 51, radar device 52 and the like of the detection device 50 of the onboard apparatus 200 to perform a method in which a confirmation is made as to whether another avoidance object (such as another vehicle and a road structure) exists or a method in which a confirmation is made as to whether the lane adjacent to the travel lane Ln1 for the subject vehicle V1 is the oncoming lane Ln2.

In step S205, the control device 10 acquires information on the road type of the road on which the subject vehicle V1 is traveling, from the navigation device 120 of the onboard apparatus 200.

In step S206, the control device 10 takes into account the information on the existence possibility of another avoidance object acquired in step S204 and the information on the road type acquired in step S205 to plan a target route RT (target coordinates) for actually driving the subject vehicle V1, on the basis of the target route RT obtained provisionally in step S203. Specifically, the higher the possibility that another avoidance object appears is, the control device 10 first adjusts the target route RT obtained provisionally in step S203 such that the distance d0 between the turning point $P_A$ and the subject vehicle V1 is shorter, as described above, and further adjusts the target route RT to have a trajectory that passes a nearer position to the other vehicle V2. The control device 10 then adjusts, in accordance with the type of road on which the subject vehicle V1 is traveling, the distance d0 between the turning point $P_A$ and the subject vehicle V1 and the distance from the avoidance object, as described above, for the target route RT obtained provisionally in step S203.

Step S206 is followed by step S207, in which the control device 10 executes the process of step S106 and subsequent steps.

The travel control device 100 according to one or more embodiments of the present invention is configured and operates as the above and therefore has the following effects.

(1) According to the travel control device 100 in one or more embodiments of the present invention, the target route is planned for avoiding an avoidance object such that, the shorter the margin distance which is a distance between a lane marker on a road and the subject vehicle V1 is, the shorter the distance d0 between the turning point $P_A$ and the subject vehicle V1 is set for the target route RT. Through this operation, the shorter the margin distance is, the earlier the timing of avoiding the avoidance object can be set. Therefore, an uncomfortable feeling given to the passengers can be mitigated when performing travel control for the subject vehicle V1.

(2) According to the travel control device 100 in one or more embodiments of the present invention, when the subject vehicle V1 is assumed to travel on the target route RT and locate at a point (passing point $P_F$) at which the subject vehicle V1 overtakes or passes by an avoidance object, the distance between the subject vehicle V1 and a lane marker at the passing point $P_F$ as a margin distance. Through this operation, when the width of the travel lane Ln5 on which the subject vehicle V1 is traveling narrows in the vicinity of the passing point $P_F$, or in similar cases, an appropriate target route can be newly planned in accordance with the margin distance (distance WA7) at the passing point $P_F$, and an uncomfortable feeling given to the passengers can be more appropriately mitigated when performing travel control for the subject vehicle V1.

(3) According to the travel control device 100 in one or more embodiments of the present invention, the shorter the margin distance is, the target route RT is planned to have a trajectory that passes a nearer position to the avoidance object, that is, set such that the distance between the target route and the avoidance object along the road width direction is shorter. Through this operation, the shorter the margin distance is, the smaller the amount that the subject vehicle V1 traveling on the target route deviates along the road width direction can be. Therefore, an uncomfortable feeling given to the passengers can be mitigated when performing travel control for the subject vehicle V1.

(4) According to the travel control device 100 in one or more embodiments of the present invention, the distance between the lane marker Lm3 of the travel lane Ln1 and the subject vehicle V1 is the margin distance and the target route can thereby be planned in accordance with the distance in which the subject vehicle V1 in the travel lane Ln1 can move in the direction (+x) of deviating from the avoidance object. Therefore, an uncomfortable feeling given to the passengers can be more mitigated when performing travel control for the subject vehicle V1.

(5) According to the travel control device 100 in one or more embodiments of the present invention, the margin distance is calculated on the basis of the distance from the target route to a lane marker. Therefore, even when the margin distance, which is the distance between the lane marker and the subject vehicle V1, cannot be directly measured, the margin distance can be appropriately calculated.

(6) According to the travel control device 100 in one or more embodiments of the present invention, the margin distance is calculated on the basis of the width of the travel lane Ln1 on which the subject vehicle V1 is traveling. Therefore, even when the margin distance, which is the distance between a lane marker and the subject vehicle V1, cannot be directly measured, the margin distance can be appropriately calculated.

(7) According to the travel control device 100 in one or more embodiments of the present invention, the margin distance is calculated on the basis of the width of an adjacent lane to the travel lane Ln1 on which the subject vehicle V1 is traveling. Therefore, even when the margin distance, which is the distance between a lane marker and the subject vehicle V1, cannot be directly measured, the margin distance can be appropriately calculated.

(8) According to the travel control device 100 in one or more embodiments of the present invention, the higher the existence possibility of another avoidance object other than the avoidance object which the subject vehicle V1 attempts to avoid is, the shorter the distance d0 between the turning point $P_A$ and the subject vehicle V1 is set for the target route RT. Through this operation, the higher the existence possibility of the other avoidance object is, the earlier the timing of avoiding the avoidance object can be set. Therefore, an uncomfortable feeling given to the passengers can be mitigated when performing travel control for the subject vehicle V1.

(9) According to the travel control device 100 in one or more embodiments of the present invention, the higher the existence possibility of another avoidance object is, the target route RT is planned to have a trajectory that passes a nearer position to the avoidance object, that is, set such that the distance between the target route and the avoidance object along the road width direction is shorter. Through this operation, the higher the existence possibility of the other avoidance object is, the smaller the amount that the subject vehicle V1 traveling on the target route deviates along the road width direction can be. Therefore, an uncomfortable feeling given to the passengers can be mitigated when performing travel control for the subject vehicle V1.

(10) According to the travel control device 100 in one or more embodiments of the present invention, the distance d0 between the turning point $P_A$ and the subject vehicle V1 is adjusted for the target route RT to be planned, in accordance with the road type of a road on which the subject vehicle V1 is traveling. This allows the target route to be planned in accordance with the road type of a road on which the subject vehicle V1 is traveling, and an uncomfortable feeling given to the passengers can be more appropriately mitigated when performing travel control for the subject vehicle V1.

(11) According to the travel control device 100 in one or more embodiments of the present invention, the distance between the target route RT to be planned and the avoidance object along the road width direction is adjusted in accordance with the road type of a road on which the subject vehicle V1 is traveling. This allows the target route to be set in accordance with the road type of a road on which the subject vehicle V1 is traveling, and an uncomfortable feeling given to the passengers can be more appropriately mitigated when performing travel control for the subject vehicle V1.

(12) According to the travel control device 100 in one or more embodiments of the present invention, the shorter the distance between the subject vehicle V1 and the avoidance object is, the shorter the distance d0 between the turning point $P_A$ and the subject vehicle V1 is set for the target route RT. Through this operation, the closer the subject vehicle V1 and the avoidance object are to each other, the earlier the timing of avoiding the avoidance object can be set. Therefore, an uncomfortable feeling given to the passengers can be mitigated when performing travel control for the subject vehicle V1.

(13) According to the travel control device 100 in one or more embodiments of the present invention, the shorter the distance between the subject vehicle V1 and the avoidance object in the road width direction is, the target route RT is planned to have a trajectory that passes a farther position from the avoidance object, that is, set such that the distance between the target route and the avoidance object along the road width direction is longer. Through this operation, the closer the subject vehicle V1 and the avoidance object are to each other in the road width direction, the subject vehicle V1 can deviate farther from the avoidance object. Therefore, an uncomfortable feeling given to the passengers can be mitigated when performing travel control for the subject vehicle V1.

(14) According to the travel control device 100 in one or more embodiments of the present invention, a route for avoiding the object area set for an avoidance object is planned as the target route and the avoidance object can thereby be more appropriately avoided when performing travel control for the subject vehicle V1. Moreover, by planning a route for avoiding the object area as the target route, the size or the like of the object area set for the avoidance object can be varied to allow the target route to be flexibly adjusted.

(15) According to the travel control device 100 in one or more embodiments of the present invention, information regarding the travel control for avoiding the object area is output to external thereby to preliminarily inform the passengers in the subject vehicle and/or other vehicles of the behavior of the subject vehicle. This allows the passengers of the subject vehicle and/or other vehicles to respond to the behavior of the subject vehicle.

(16) When the travel control method according to one or more embodiments of the present invention is executed by the control device 10, the same action and effect can be obtained as in the above travel control device 100.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

That is, in the present description, one or more embodiments of the travel control device according to the present invention are described by exemplifying the travel control device 100 which, together with the onboard apparatus 200, constitutes the travel control system 1, but the present invention is not limited to this.

In the present description, the travel control device 100 comprising the control device 10 which executes the object information acquisition function, area setting function, route planning function, control function and presentation function is described as one example of a travel control device comprising a subject vehicle information acquisition unit, object information acquisition unit, planning unit, setting unit, control unit and output unit, but the present invention is not limited to this. In the present description, the travel control device 100 further comprising the output devices 30 and 110 is described as one example of a travel control device further comprising an output unit, but the present invention is not limited to this.

DESCRIPTION OF REFERENCE NUMERALS

1 Travel control system
100 Travel control device
  10 Control device
    11 CPU
    12 ROM
    13 RAM
  20 Communication device
  30 Output device
    31 Display
    32 Speaker
200 onboard apparatus
  40 Communication device
  50 Detection device
    51 Camera
    52 Radar device
  60 Sensor
    61 Steering angle sensor
    62 Vehicle speed sensor
  70 Vehicle controller
  80 Driving device
    81 Braking device
  90 Steering device
  110 Output device
    111 Display
    112 Speaker
    113 Exterior lamp
    114 Interior lamp
  120 Navigation device
    121 Position detection device
    122 Road information
    123 Map information

The invention claimed is:

1. A travel control device comprising:
a subject vehicle information acquisition unit configured to acquire subject vehicle information including a position of a subject vehicle;
an object information acquisition unit configured to acquire object information including a position of a first avoidance object which the subject vehicle should avoid;
a planning unit configured to plan a target route for avoiding the first avoidance object in accordance with the position of the subject vehicle and the position of the first avoidance object;
a control unit configured to output command information for driving the subject vehicle on the target route; and
a margin distance information acquisition unit configured to acquire information on a margin distance, the margin distance being a distance between the subject vehicle and a lane marker on a road on which the subject vehicle is traveling, the margin distance being along a width direction of the road,
wherein the planning unit, when planning the target route, reduces a distance from the subject vehicle to a turning point as the margin distance decreases, the turning point being a point at which avoidance of the first avoidance object starts in a direction of deviating from the first avoidance object along the width direction.

2. The travel control device according to claim 1, wherein the margin distance is a distance between the lane marker and the subject vehicle at a current position of the subject vehicle or a distance between the lane marker and the subject vehicle at a point at which the subject vehicle is expected to overtake or pass by the first avoidance object.

3. The travel control device according to claim 1, wherein the planning unit reduces a distance between the target route and the first avoidance object along the width direction as the margin distance decreases.

4. The travel control device according to claim 1, wherein the lane marker comprises a pair of lane markers that define a travel lane in which the subject vehicle is traveling and the margin distance is a distance along the width direction between the subject vehicle and a lane marker of the pair of lane markers at an opposite side to a side of the first avoidance object.

5. The travel control device according to claim 1, wherein the lane marker comprises a pair of lane markers that define a travel lane in which the subject vehicle is traveling and the margin distance is calculated on a basis of a distance between either of the pair of lane markers and the target route along the width direction.

6. The travel control device according to claim 1, wherein the margin distance is calculated on a basis of a width of a travel lane in which the subject vehicle is traveling.

7. The travel control device according to claim 1, wherein the margin distance is calculated on a basis of a width of an adjacent lane to a travel lane in which the subject vehicle is traveling.

8. The travel control device according to claim 1, wherein the planning unit estimates an existence possibility of a second avoidance object other than the first avoidance object on the road on which the subject vehicle is traveling, and when planning the target route, reduces the distance from the subject vehicle to the turning point in the target route as the existence possibility of the second avoidance object increases.

9. The travel control device according to claim 8,
wherein the planning unit, when planning the target route, reduces a distance between the target route and the first avoidance object along the width direction as the existence possibility of the second avoidance object increases.

10. The travel control device according to claim 1,
wherein the planning unit acquires information on a road type of the road on which the subject vehicle is traveling, and adjusts the distance from the subject vehicle to the turning point in the target route in accordance with the information on the road type.

11. The travel control device according to claim 10,
wherein the planning unit plans a distance between the target route and the first avoidance object along the width direction in accordance with the information on the road type.

12. The travel control device according to claim 1,
wherein the first setting unit acquires information on a distance between the subject vehicle and the first avoidance object along the width direction of the road on which the subject vehicle is traveling, and reduces the distance from the subject vehicle to the turning point in the target route as the distance between the subject vehicle and the first avoidance object along the width direction of the road on which the subject vehicle is traveling decreases.

13. The travel control device according to claim 12,
wherein, as the distance between the subject vehicle and the first avoidance object along the width direction of the road on which the subject vehicle is traveling decreases, the planning unit increases a distance between the target route and the first avoidance object along the width direction.

14. The travel control device according to claim 1,
further comprising a setting unit configured to set an object area on a basis of the position of the first avoidance object,
wherein the planning unit plans, as the target route, a route for avoiding the object area set by the setting unit.

15. The travel control device according to claim 1,
further comprising an output unit configured to output one or more information items among information in accordance with the object information, information in accordance with a location of the target route, and information in accordance with the command information for driving the subject vehicle on the target route to an onboard apparatus of the subject vehicle, the onboard apparatus being connected to the travel control device.

16. A travel control method executed by a computer, the computer outputting command information for driving a subject vehicle on a target route, the travel control method comprising:
acquiring subject vehicle information including a position of the subject vehicle;
acquiring object information including a position of an avoidance object which the subject vehicle should avoid;
acquiring information on a margin distance, the margin distance being a distance between the subject vehicle and a lane marker on a road on which the subject vehicle is traveling, the margin distance being along a width direction of the road; and
planning a target route in which a distance from the subject vehicle to a turning point decreases as the margin distance decreases, the turning point being a point at which a position along the width direction varies by a predetermined distance or more.

* * * * *